(12) United States Patent
Lima et al.

(10) Patent No.: US 12,312,466 B2
(45) Date of Patent: May 27, 2025

(54) POLYAMIDE FORMULATIONS FOR IMPROVED NOISE VIBRATION AND HARSHNESS

(71) Applicant: Ascend Performance Materials Operations LLC, Houston, TX (US)

(72) Inventors: Avelino Lima, Houston, TX (US); Jacob G. Ray, Houston, TX (US); Ted Wieczorek, Houston, TX (US); Kai Becker, Houston, TX (US); Bradley J. Sparks, Houston, TX (US); Tariq Oweimreen, Houston, TX (US)

(73) Assignee: Ascend Performance Materials Operations LLC, Houston, TX (US)

( * ) Notice: Subject to any disclaimer, the term of this patent is extended or adjusted under 35 U.S.C. 154(b) by 583 days.

(21) Appl. No.: 17/318,754

(22) Filed: May 12, 2021

(65) Prior Publication Data

US 2021/0355322 A1 Nov. 18, 2021

Related U.S. Application Data

(60) Provisional application No. 63/119,201, filed on Nov. 30, 2020, provisional application No. 63/045,009, (Continued)

(51) Int. Cl.
*C08L 77/06* (2006.01)
*B60G 21/055* (2006.01)
(Continued)

(52) U.S. Cl.
CPC ............ *C08L 77/06* (2013.01); *F16F 1/3605* (2013.01); *B60G 21/055* (2013.01);
(Continued)

(58) Field of Classification Search
CPC .... Y10T 428/24008; B60K 5/00; B60K 5/12; B60K 5/1208; B60K 17/00; C08L 77/00; C08L 77/06
(Continued)

(56) References Cited

U.S. PATENT DOCUMENTS

2008/0026245 A1 1/2008 Saga
2008/0026246 A1 1/2008 Saga et al.
(Continued)

FOREIGN PATENT DOCUMENTS

CN 108779329 A 11/2018
JP H02140265 A 5/1990
(Continued)

OTHER PUBLICATIONS

Machine translation (Espacenet) of JP 2017-002205 A. Translated Mar. 9, 2024. (Year: 2024).*

*Primary Examiner* — Maria V Ewald
*Assistant Examiner* — Ethan A. Utt
(74) *Attorney, Agent, or Firm* — COZEN O'CONNOR

(57) ABSTRACT

Provided herein are polyamide compositions including one or more semi-crystalline polyamides and either an amorphous polyamide or a semi-crystalline copolyamide such as PA66/6. The provided compositions are particularly useful as vibration isolators more effective at high-temperature noise and harshness damping than conventional polyamide compositions. Also provided are methods for making the provided compositions, and articles that include the provided compositions.

18 Claims, 1 Drawing Sheet

Related U.S. Application Data filed on Jun. 26, 2020, provisional application No. 63/024,872, filed on May 14, 2020.

(51) Int. Cl.
  *B60K 5/12* (2006.01)
  *B60K 17/00* (2006.01)
  *F16F 1/36* (2006.01)
  *F16M 13/02* (2006.01)

(52) U.S. Cl.
  CPC ............ *B60G 2206/11* (2013.01); *B60G 2206/71043* (2013.01); *B60K 5/1208* (2013.01); *B60K 17/00* (2013.01); *C08L 2205/03* (2013.01); *F16F 2224/02* (2013.01); *F16M 13/02* (2013.01)

(58) Field of Classification Search
  USPC .............................. 428/99; 296/1.03, 901.01
  See application file for complete search history.

(56) References Cited

U.S. PATENT DOCUMENTS

| | | | | |
|---|---|---|---|---|
| 2012/0196973 | A1* | 8/2012 | Doshi | C08L 77/06 |
| | | | | 524/538 |
| 2015/0274968 | A1* | 10/2015 | Bayer | C08K 7/14 |
| | | | | 264/523 |
| 2017/0313856 | A1* | 11/2017 | Oda | C08K 7/02 |
| 2018/0222128 | A1* | 8/2018 | Tomioka | B29C 43/48 |
| 2020/0087458 | A1* | 3/2020 | Ieda | C08K 3/22 |

FOREIGN PATENT DOCUMENTS

| | | | | |
|---|---|---|---|---|
| JP | 2009544799 A | | 12/2009 | |
| JP | 2013159675 A | | 8/2013 | |
| JP | 2017002205 A | * | 1/2017 | |
| JP | 2019127500 A | | 8/2019 | |
| JP | 2020055940 A | | 4/2020 | |
| WO | WO-2018181995 A1 | * | 10/2018 | ............ C08G 69/26 |
| WO | 2019208741 A1 | | 10/2019 | |

\* cited by examiner

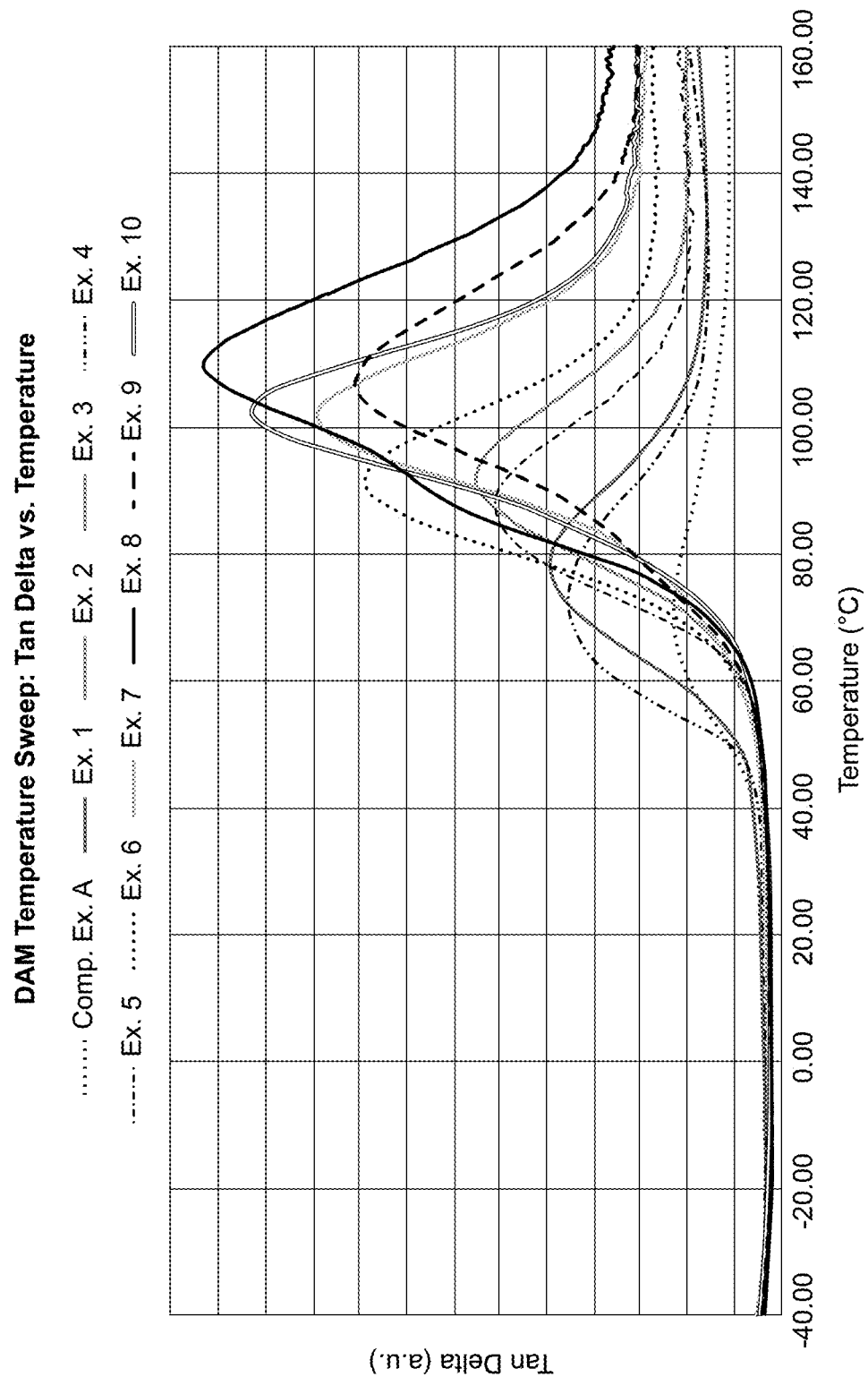

POLYAMIDE FORMULATIONS FOR IMPROVED NOISE VIBRATION AND HARSHNESS

CROSS-REFERENCE TO RELATED APPLICATION

This application claims priority to U.S. Provisional Application No. 63/024,872, filed May 14, 2020; U.S. Provisional Application No. 63/045,009, filed Jun. 26, 2020; and U.S. Provisional Application No. 63/119,201, filed Nov. 30, 2020; each of which is incorporated herein by reference.

FIELD

The present disclosure relates to polyamide compositions, particularly polyamide compositions that have improved damping performance at elevated temperatures, such that the compositions are particularly useful in automotive vibrations isolators.

BACKGROUND

There is a need in many markets, e.g., the automotive market, the home appliance market, and the electronics market, for the reduction of undesired vibrations and associated noise generation. As an example, the automotive industry is trending towards an increased adoption of lighter weight vehicles. As such, there has been an increased use of lighter weight aluminum and polymer materials. The use of these designs and materials, however, leads to additional issues relating to vehicle vibration and vibration-related noise. Furthermore, consumer awareness of cabin noise has been heightened through the increased adoption of electrified vehicles lacking the sound generation associated with combustion engines.

Generally such noise and vibration issues have been managed through two approaches: the stiffening of structure geometry to be more resistant to vibration, and structural damping to reduce the vibration amplitude. Along with these solutions, acoustic technologies can be used to absorb, reflect, and isolate sound waves from their source, for example before they reach a passenger in an automotive cabin.

Structural damping approaches can involve the use of polymeric materials in the manufacture of, for example, vibration isolators such as automotive engine mount brackets. The damping properties of these materials can rely in part on the relaxation and recovery of the polymer network after it has been deformed. These polymeric properties are strongly dependent on both frequency effects and temperature effects, due to the direct relationship between material temperature and molecular motion. Accordingly, different polymeric materials have been developed to possess a variety of damping, strength, durability, creep resistance, thermal stability, and other desirable properties, over selected temperature and frequency ranges.

Despite these efforts, it has been difficult to tailor polymeric materials to simultaneously meet more than one of these properties over a wide variety of operating conditions. For example, glass fiber reinforced (GFR) nylon compounds have found extensive use in vibration isolation components of internal combustion engines. These compounds, however, become significantly less effective as operating temperatures approach 70° C.

Thus, the need exists for polyamide compositions capable of providing effective noise vibration absorption at higher temperatures, while maintaining desired mechanical strength properties.

SUMMARY

In one aspect, the disclosure is to a composition including one or more amorphous polyamides, and one or more semi-crystalline polyamides. The composition exhibits a maximum viscoelastic loss factor (tan(δ)) at a temperature greater than 40° C., e.g., greater than 50° C. (ranging from 73° C. to 103° C.) when the composition has a moisture content less than 0.2 wt %. In some embodiments, the combined concentration of the one of more amorphous polyamides in the composition ranges from 10 wt % to 70 wt % (from 3 wt % to 65 wt % or from 3 wt % to 53 wt %). In some embodiments, at least one of the one or more amorphous polyamides exhibits a glass transition temperature ($T_g$) greater than 100° C. (ranging from 100° C. to 150° C.). In some embodiments, at least one of the amorphous polyamides includes an amorphous copolyamide. In some cases, the amorphous polyamide comprises polyamide blends of MPMD-T and MPMD-I and/or the semi-crystalline polyamide comprises PA66/6C. In some embodiments, the combined concentration of the one or more semi-crystalline polyamides in the composition ranges from 10 wt % to 70 wt %, e.g., from 30 wt % to 80 wt %. In some embodiments, at least one of the semi-crystalline polyamides is a PA66 polyamide. In some embodiments, at least one of the semi-crystalline polyamides is a PA6 polyamide. In some embodiments, at least one of the semi-crystalline polyamides is a PA66/6 (co)polyamide and/or PA66/6C. In some embodiments, at least one of the semi-crystalline polyamides is a PA66/6I polyamide. In some embodiments, at least one of the PA66/6I polyamides includes an isophthalic acid content ranging from 5 mol % to 13 mol %. In some embodiments, the ratio of the combined weight of the one or more semi-crystalline polyamides in the composition to the combined weight of the one or more amorphous polyamides in the composition ranges from 0.06:1 to 13:1 (from 1:1 to 13:1). In some embodiments, the composition further includes from 0.1 wt % to 2 wt % of at least one lubricant. In some embodiments, at least one lubricant includes aluminum stearate. In some embodiments, the composition further includes fro 0.1 wt % to 2 wt % of at least one heat stabilizer. In some embodiments, at least one heat stabilizer includes copper. In some embodiments, the composition further includes from 15 wt % to 60 wt % of at least one mineral or fiber reinforcement. In some embodiments, at least one mineral or fiber reinforcement includes glass fiber. In some embodiments, the maximum tan(δ) has a value ranging from 0.057 to 0.245 (from 0.095 to 0.245) when the composition has a moisture content less than 0.2 wt %. In some embodiments, the difference between (1) a heat distortion temperature (HDT) exhibited by the composition at 1.82 MPa and (2) a melting temperature ($T_m$) exhibited by the composition ranges from 1° C. to 100° C. (from 15° C. to 45° C.) when the composition has a moisture content less than 0.2 wt %. In some embodiments, the composition includes: from 20 wt % to 55 wt % semi-crystalline PA66 polyamide; from 20 wt % to 55 wt % semi-crystalline PA66/6I polyamide; from 0 to 11 wt % semi-crystalline PA6 polyamide; from 8 wt % to 40 wt % amorphous polyamide; from 15 wt % to 60 wt % glass fiber; from 0.1 wt % to 2 wt % aluminum stearate; from 0.1 wt % to 2 wt % copper heat stabilizer; from 0 to 6 wt % colorant;

and a moisture content less than 0.2 wt %; wherein the maximum tan(δ) value of the composition ranges from 0.095 to 0.15 and is exhibited at a temperature from 75° C. to 95° C. In some embodiments, the composition exhibits a tensile strength ranging from 150 MPa to 255 MPa, as measured in accordance with standard test method ASTM D882-18 (2018). In some embodiments, the composition exhibits an elongation at break ranging from 1.5% to 5%, as measured in accordance with standard test method ASTM D882-18 (2018). In some embodiments, the composition exhibits a tensile modulus ranging from 9.5 GPa to 20.5 GPa, as measured in accordance with standard test method ASTM D882-18 (2018). In some embodiments, the composition exhibits a notched Charpy impact strength ranging from 7 kJ/m$^2$ to 15 kJ/m$^2$. In some embodiments, the composition exhibits an un-notched Charpy impact strength ranging from 50 kJ/m$^2$ to 100 kJ/m$^2$. In some embodiments, the composition exhibits a $T_m$ ranging from 205° C. to 285° C. In some embodiments, the composition exhibits an HDT at 1.82 MPa ranging from 185° C. to 255° C. In some embodiments, the composition includes: from 20 wt % to 55 wt % semi-crystalline PA66 polyamide; from 20 wt % to 55 wt % semi-crystalline PA66/6I polyamide; from 0 to 11 wt % semi-crystalline PA6 polyamide; from 8 wt % to 40 wt % amorphous polyamide; from 15 wt % to 60 wt % glass fiber; from 0.1 wt % to 2 wt % aluminum stearate; from 0.1 wt % to 2 wt % copper heat stabilizer; from 0 to 6 wt % colorant; and a moisture content less than 0.2 wt %; wherein the maximum tan(δ) of the composition is exhibited at a temperature ranging from 75° C. to 95° C.; and wherein the difference between (1) the HDT of the composition at 1.82 MPa and (2) the Tm of the composition ranges from 15° C. to 45° C. In some embodiments, the composition includes: from 20 wt % to 55 wt % semi-crystalline PA66 polyamide; from 20 wt % to 55 wt % semi-crystalline PA66/6I polyamide; from 0 to 11 wt % semi-crystalline PA6 polyamide; from 8 wt % to 40 wt % amorphous polyamide; from 15 wt % to 60 wt % glass fiber; from 0.1 wt % to 2 wt % aluminum stearate; from 0.1 wt % to 2 wt % copper heat stabilizer; from 0 to 6 wt % colorant; and a moisture content less than 0.2 wt %; wherein the maximum tan(δ) of the composition is exhibited at a temperature ranging from 75° C. to 95° C.; and wherein the tensile strength of the composition ranges from 185 MPa to 205 MPa. In some cases, the tensile modulus is greater than 9.5 GPa, and the composition exhibits a maximum viscoelastic loss factor (tan(δ)) at a temperature greater than 42° C. when the composition has a moisture content less than 0.2 wt %. In some cases, the tensile modulus is greater than 9.5 GPa and the heat distortion temperature is greater than 185° C. In some embodiments, the composition comprises from 20 wt % to 55 wt % semi-crystalline PA66 polyamide; from 0 to 11 wt % semi-crystalline PA6 polyamide; from 10 wt % to 70 wt % polyamide blends with MPMD-T/MPMD-I; from 15 wt % to 60 wt % glass fiber; from 0.1 wt % to 2 wt % stearate; from 0.1 wt % to 2 wt % heat stabilizer; from 0 to 6 wt % colorant; and a moisture content less than 0.2 wt %. In some cases, the composition comprises from 10 wt % to 70 wt % semi-crystalline P; from 0 to 11 wt % semi-crystalline PA6 polyamide; from 10 wt % to 70 wt % amorphous polyamide; from 15 wt % to 60 wt % glass fiber; from 0.1 wt % to 2 wt % stearate; from 0.1 wt % to 2 wt % heat stabilizer; from 0 to 6 wt % colorant; and a moisture content less than 0.2 wt %. In some cases, the composition comprises a low $T_g$ polymer with a $T_g$ from 100° C. to 200° C., and a high $T_g$ polymer with a Tg from 0° C. to 160° C.

In another aspect, the disclosure is to a composition including from 1 wt % to 50 wt % of a semi-crystalline PA66/6 (co)polyamide, and from 4 wt % to 32 wt % of either a second semi-crystalline polyamide or an amorphous resin. The composition exhibits a maximum tan(δ) at a temperature greater than 50° C. (ranging from 73° C. to 103° C.) when the composition has a moisture content less than 0.2 wt %. In some embodiments, the semi-crystalline PA66/6I polyamide comprises an isophthalic acid content ranging from 5 mol % to 30 mol %. In some embodiments, the maximum tan(δ) has a value ranging from 0.057 to 0.245 (from 0.095 to 0.245) when the composition has a moisture content less than 0.2 wt %. In some embodiments, the amorphous polyamide exhibits a glass transition temperature ($T_g$) greater than 100° C. (ranging from 100° C. to 150° C.). In some embodiments, the amorphous polyamide includes a partially aromatic polyamide. In some embodiments, the amorphous polyamide includes an amorphous copolyamide. In some embodiments, the second semi-crystalline polyamide includes a PA66 polyamide. In some embodiments, the second semi-crystalline polyamide includes a PA6 polyamides. In some embodiments, the second semi-crystalline polyamide includes a PA66/I polyamide. In some embodiments, the composition further includes from 0.1 wt % to 2 wt % of at least one lubricant. In some embodiments, the lubricant includes aluminum stearate. In some embodiments, the composition further includes from 0.1 wt % to 2 wt % of at least one heat stabilizer. In some embodiments, the heat stabilizer includes copper. In some embodiments, the composition further includes from 15 wt % to 60 wt % of at least one mineral or fiber reinforcements. In some embodiments, the mineral or fiber reinforcements includes glass fiber. In some embodiments, the composition exhibits a tensile strength ranging from 150 MPa to 255 MPa, as measured in accordance with standard test method ASTM D882-18 (2018). In some embodiments, the composition exhibits an elongation at break ranging from 1.5% to 5%, as measured in accordance with standard test method ASTM D882-18 (2018). In some embodiments, the composition exhibits a tensile modulus ranging from 9.5 GPa to 20.5 GPa, as measured in accordance with standard test method ASTM D882-18 (2018). In some embodiments, the composition exhibits a notched Charpy impact strength ranging from 7 kJ/m$^2$ to 15 kJ/m$^2$. In some embodiments, the composition exhibits an un-notched Charpy impact strength ranging from 50 kJ/m$^2$ to 100 kJ/m$^2$.

In another aspect, the disclosure is to an article molded from a resin having any of the compositions disclosed herein. The article may be a connecting part, which may comprise: a part body for contacting a first component; and a part tab for contacting a second component to connect the first and second components; an optional structural support piece; at least one of the part body and the part tab may comprises the aforementioned compositions. In some cases, the part is an engine mount, a differential mount, a torque rod, and HVAC compressor bracket, a strut mount, a shock absorber mount, or a transmission mount, or a combination thereof.

In some embodiments, the disclosure relates to a process for connecting a first component to a second component, the process comprising: providing a connecting part comprising a part body and a part tab; contacting the part body with the first component; and contacting the part tab with the second component to connect first and second components, wherein the part exhibits a maximum tan(δ) at a temperature greater than 40° C. when the composition has a moisture content less than 0.2 wt %. The connecting part may be an engine mount, the first component may be an engine, and the second component may be a chassis.

BRIEF DESCRIPTION OF THE FIGURES

FIG. 1 is a graph showing tan(δ) performance of some embodiments of the polyamide compositions described herein.

DETAILED DESCRIPTION

The present disclosure generally relates to polyamide compositions that, when employed for example as damping materials, provide advantageous improvements in vibrational noise isolation characteristics at elevated operating temperatures.

For example, although it has not been yet achieved, it would be beneficial for polyamide compositions to have sufficient damping ability, e.g., as measured by the viscoelastic loss factor tan(δ), to effectively isolate vibrations under operating conditions that can be present in certain automotive applications and that can include a temperature exceeding 72° C. One measure of the damping performance of the provided compositions is the temperature at which the viscoelastic loss factor (tan(δ)) exhibits its maximum. In general, the higher the temperature of this maximum, the more effective the composition is at damping and isolating vibration and noise at higher temperatures. It is also beneficial for a polyamide composition to exhibit good strength characteristics, e.g., high tensile strength, elongation at break, impact resistance, and fatigue resistance at these elevated environmental temperatures.

Polyamides are hygroscopic and tend to absorb moisture, and performance characteristics of polyamide compositions can vary based on composition moisture content. And because some applications, e.g., automotive parts, often operate under higher temperature conditions and/or high humidity conditions, e.g., where humidity may differ per geographic jurisdiction, low moisture compositions have been found to be particularly desirable. In particular, when (lightweight) hygroscopic polymers, e.g., nylons, are employed, compositional moisture should be contemplated/ considered. As such, it has been found that performance measured at low moisture content, e.g., tan(δ) performance at low moisture content (such as less than or equal to 0.2 wt %) is a particularly germane metric, as it leads to a benchmark metric with little or no outside environmental influence. When higher moisture content is utilized and performance weight is measured, there can be more uncertainty in the performance and in the measurement thereof. Importantly, measurements/performance at low water content may not correspond to measurements/performance at high water content. This is especially true for hygroscopic polymers. Advantageously, the polyamide compositions disclosed herein demonstrate synergistic combinations of performance characteristics generally, and especially when measured at low water content.

It has been difficult, however, for conventional polyamide compositions to achieve these performance features. One reason for this is that conventional compositions (low moisture or otherwise) exhibit their peak tan(δ) at a low temperature at or below 40° C., e.g., at or below 72° C., indicating that the maximum damping ability of the composition is observed only at lower temperatures. In addition, modifications typically used to strengthen polyamide compositions most often have the effect of degrading the thermal and damping properties of these materials, further reducing the temperatures at which they demonstrate a peak tan(δ).

The inventors have surprisingly discovered that specific combinations of polyamides disclosed herein, optionally added in particular types, amounts, and ratios, can be utilized to form a composition having an improved higher maximum tan(δ) temperature. In particular, these results have been found with compositions combining a semi-crystalline polyamide (A) with either: 1) an amorphous polyamide (B1); and/or 2) another semi-crystalline copolyamide (B2), e.g., PA66/6 polyamide or PA66/6C polyamide, (where A may be different from B2). Notably, the importance of the amorphous polyamide or PA66/6 polyamide in improving high temperature damping had not been previously appreciated. The improved damping performance is reflected not only in a higher maximum tan(δ) temperature, but for many cases in a higher maximum tan(δ) viscoelastic value as well. Importantly, because mechanical characteristics, e.g., strength and impact resistance, are maintained at the high levels (previously only observed in the absence of the amorphous or PA66/6I polyamide additive), the provided compositions are particularly well-suited for applications having dual needs for both high stability and high damping.

Moreover, because other thermal characteristics are similarly maintained at levels similar to those of formulations without the amorphous or PA66/6 additive, the provided compositions also find good compatibility with existing manufacturing processes, e.g., molding and thermoforming processes. Additionally, in some embodiments the heat distortion temperature (HDT) of the composition is close to, e.g., within 45° C. or within 35° C., of the composition melting temperature ($T_m$). Because the $T_m$ of a polymer composition is substantially unaffected by the presence of other fillers and additives present in the composition, whereas the HDT of a polymer composition generally increases as the filler loading level rises, the surprising similarity between the HDT and $T_m$ of some embodiments of the disclosed reinforced compositions can provide another benefit related to ease of processability.

The overall performance is particularly important for some specific applications, e.g., the aforementioned automotive parts, which, in use, connect one automotive component to another automotive component, e.g., they mount an engine to a chassis. In these applications, the ability of the part (made from the disclosed NVH composition) to effectively isolate vibrations results in quieted performance. Conventional connecting parts often employ rubber pieces, often together with multiple rigid structural (metal) pieces, to achieve similar performance. It is believed that when the disclosed NVH compositions are used for connecting parts, this multiple-piece construction can be reduced/avoided, which reduces/eliminates the number/size of the multiple pieces, thus improving manufacturing efficiency.

The disclosure relates, in some embodiments, to polyamide compositions comprising one or more amorphous polyamides and one or more semi-crystalline polyamides. In some embodiments, the disclosure relates to polyamide compositions that comprise a first semi-crystalline (co) polyamide, e.g., PA66/6 (co)polyamide, and either a second semi-crystalline polyamide and/or an amorphous polyamide. These polyamide compositions have been found to provide surprising improvements in high temperature damping. For example, the composition exhibits a maximum viscoelastic loss factor (tan(δ)) at a temperature above 40° C., e.g., above 72° C., when the composition has a moisture content less than 0.2 wt %.

Compositions

Amorphous Polyamide

In one aspect, a polyamide composition including one or more amorphous polyamides is disclosed. As used herein the terms "polyamide" or "nylon" refer to a polymer containing at least 50 mol %, e.g., at least 60 mol %, at least 70 mol %, at least 80 mol %, at least 90 mol %, at least 92 mol %, at least 94 mol %, at least 96 mol %, at least 98 mol %, or at least 99 mol % of a recurring unit that includes at least one amide group. As used herein, the term "amorphous polyamide" refers to a polyamide including substantially no crystalline region, e.g., no crystalline region, and exhibiting no clear melting point. The composition further includes one or more semi-crystalline polyamides. As used herein, the term "semi-crystalline polyamide" refers to a polyamide including at least one crystalline region and exhibiting a clear melting point. These polyamide compositions have been found to provide surprising improvements in high temperature damping. For example, the composition exhibits a maximum viscoelastic loss factor (tan($\delta$)) at the temperatures noted above and herein, when the composition has a moisture content less than 0.2 wt %. In some embodiments, the composition further exhibits an HDT less than 35° C. different than the $T_m$ exhibited by the composition when the composition has a moisture content less than 0.2 wt %. Other performance features are discussed below.

In some embodiments, the combined concentration of the one or more amorphous polyamides in the composition ranges from 3 wt % to 75 wt %, e.g., from 3 wt % to 65 wt %, from 3 wt % to 60 wt %, from 5 wt % to 55 wt %, from 3 wt % to 53 wt %, from 3 wt % to 33 wt %, from 7 wt % to 32 wt %, from 8 wt % to 38 wt %, from 13 wt % to 43 wt %, from 18 wt % to 48 wt %, 30 wt % to 60 wt %, or from 23 wt % to 53 wt %. The combined concentration of the amorphous polyamides can range from 8 wt % to 40 wt %, e.g., from 8 wt % to 27.2 wt %, from 11.2 wt % to 30.4 wt %, from 14.4 wt % to 33.6 wt %, from 17.6 wt % to 36.8 wt %, or from 20.8 wt % to 40 wt %. In terms of upper limits, the amorphous polyamide concentration can be less than 75 wt %, e.g., less than 70 wt %, less than 65 wt %, less than 60 wt %, less than 55 wt %, less than 53 wt %, less than 48 wt %, less than 43 wt %, less than 40 wt %, less than 36.8 wt %, less than 33.6 wt %, less than 30.4 wt %, less than 27.2 wt %, less than 24 wt %, less than 20.8 wt %, less than 17.6 wt %, less than 14.4 wt %, less than 11.2 wt %, or less than 8 wt %. In terms of lower limits, the amorphous polyamide concentration can be greater than 3 wt %, e.g., greater than 7 wt %, greater than 11.2 wt %, greater than 14.4 wt %, greater than 17.6 wt %, greater than 20.8 wt %, greater than 24 wt %, greater than 27.2 wt %, greater than 30.4 wt %, greater than 33.6 wt %, greater than 36.8 wt %, greater than 40 wt %, greater than 43 wt %, or greater than 48 wt %, Higher concentrations, e.g., greater than 53 wt %, and lower concentrations, e.g., less than 3 wt %, are also contemplated.

As used herein, "greater than" and "less than" limits may also include the number associated therewith. Stated another way, "greater than" and "less than" may be interpreted as "greater than or equal to" and "less than or equal to." It is contemplated that this language may be subsequently modified in the claims to include "or equal to." For example, "greater than 4.0" may be interpreted as, and subsequently modified in the claims as "greater than or equal to 4.0."

In some embodiments, the concentration of the amorphous polyamide ranges from 4 wt % to 32 wt %, e.g., from 4 wt % to 20.8 wt %, from 6.8 wt % to 23.6 wt %, from 9.6 wt % to 26.4 wt %, from 12.4 wt % to 29.2 wt %, or from 15.2 wt % to 32 wt %. In terms of upper limits, the amorphous polyamide concentration can be less than 32 wt %, e.g., less than 29.2 wt %, less than 26.4 wt %, less than 23.6 wt %, less than 20.8 wt %, less than 18 wt %, less than 15.2 wt %, less than 12.4 wt %, less than 9.6 wt %, or less than 6.8 wt %. In terms of lower limits, the amorphous polyamide concentration can be greater than 4 wt %, e.g., greater than 6.8 wt %, greater than 9.6 wt %, greater than 12.4 wt %, greater than 15.2 wt %, greater than 18 wt %, greater than 20.8 wt %, greater than 23.6 wt %, greater than 26.4 wt %, or greater than 29.2 wt %. Higher concentrations, e.g., greater than 32 wt %, and lower concentrations, e.g., less than 4 wt %, are also contemplated.

In some embodiments, the concentration of the amorphous polyamide ranges from 10 wt % to 70 wt %, e.g., from 15 wt % to 60 wt %, from 15 wt % to 50 wt %, from 20 wt % to 45 wt %, from 25 wt % to 40 wt %, from 30 wt % to 40 wt %, or from 30 wt % to 37 wt %. In terms of upper limits, the amorphous polyamide concentration can be less than 70 wt %, e.g., less than 65 wt %, less than 60 wt %, less than 65 wt %, less than 55 wt %, less than 50 wt %, less than 45 wt %, less than 40 wt %, or less than 37 wt %. In terms of lower limits, the amorphous polyamide concentration can be greater than 10 wt %, e.g., greater than 15 wt %, greater than 20 wt %, greater than 25 wt %, greater than 27 wt %, greater than 30 wt %, or greater than 31 wt %. Higher concentrations, e.g., greater than 70 wt %, and lower concentrations, e.g., less than 10 wt %, are also contemplated.

In some embodiments, the amorphous polyamide comprises a polyamide with isophthalic and/or terephthalic content. For example, the amorphous polyamide may comprise PA-4T/4I; PA-4T/6I; PA-5T/5I; PA-6,6/6T; PA-6T/6I; PA-6T/6I/6; PA-6T/6; PA-6T/6I/66; PA-6T/66; PA-6I/6T, PA-6T/6; PA-6,6/6I/6; PA-6I/6; or 6T/6I16, PA-6T/610; PA-10T/612; PA-10T/106; PA-6T/612; PA-6T/10T; PA-6T/10I; PA-9T; PA-10T; PA-12T; PA-10T/10I; PA-10T/12; PA-10T/11; PA-6T/9T; PA-6T/12T; PA-6T/10T/6I; PA-6T/6I/6; PA-6T/6I/12; MPMD-T; MPMD-I; or polyamide blends with MPMD-T/MPMD-I, e.g., DT/DI blends; or combinations thereof. In some cases, the amorphous or semi-crystalline nature of a polyamide may be a function of the percentages of the various polymer units. The aforementioned polyamides can, in some cases, be formulated to be "amorphous" or "semi-crystalline," as defined herein. In some embodiments, these polyamides can be semi-crystalline or can be amorphous, depending on the polymer units. The skilled person will understand how to determine the amorphous or semi-crystalline (as defined herein) nature of polymers. For example, if a PA-6I/6T polyamide is formulated such that it includes substantially no crystalline region, e.g., no crystalline region, and it exhibits no clear melting point, then that PA-6I/6T would be considered an "amorphous PA-6I/6T."

In some cases, the molar ratio of the isophthalic to terephthalic content of the amorphous polyamide can range, for example, from 37:63 to 15:85, e.g., from 37:63 to 70:30, from 43:57 to 75:25, from 48:52 to 79:21, from 54:46 to 82:18, or from 60:40 to 85:15. In terms of upper limits, the isophthalic to terephthalic content ratio can be less than 85:15, e.g., less than 82:18, less than 79:21, less than 75:25, less than 70:30, less than 65:35, less than 60:40, less than 54:46, less than 48:52, or less than 43:57. In terms of lower limits, the isophthalic to terephthalic content ratio can be greater than 37:63, e.g., greater than 43:57, greater than 48:52, greater than 54:46, greater than 60:40, greater than 65:35, greater than 70:30, greater than 75:25, greater than 79:81, or greater than 82:18. Higher ratios, e.g., greater than 85:15, and lower ratios, e.g., less than 37:63, are also contemplated. Exemplary amorphous polyamide commercial products suitable for use in the provided composition include GRIVORY® G-21 from EMS Chemie and SELAR® PA3426 from DuPont.

The number of distinct species of amorphous polyamides in the provided composition can be, for example, one, two, three, four, five, six, seven, eight, nine, ten, or more than ten. In some embodiments, the one or more amorphous polyamides of the composition include a partially aromatic polyamide. In some embodiments, each amorphous polyamide of the composition is a partially aromatic polyamide. In some embodiments, the one or more amorphous polyamides include an amorphous copolyamide. In some embodiments, each amorphous polyamide is an amorphous copolyamide.

In some embodiments, the amorphous polyamide of the composition is a partially aromatic polyamide. In some embodiments, the amorphous polyamide is an amorphous copolyamide. In some embodiments, the amorphous polyamide is transparent. The use of the amorphous polyamide can be particularly beneficial, for example in applications requiring observation of liquid levels, packaged foods, or other materials enclosed or partitioned by polymeric materials manufactured using the compositions.

In some cases, the chemical characteristics of the polymer composition (or in one or more of the components thereof) contributes, at least in part, to the performance improvements. The disclosed compositions and parts may be characterized by the chemical characteristics, irrespective of the compositional make-up, e.g., the individual polyamides, of the polymer composition. In some cases, the compositions comprise a low $T_g$ polymer with a $T_g$ from 100° C. to 200° C. and a high $T_g$ polymer with a Tg from 0° C. to 160° C.

In some embodiments, at least one of the amorphous polyamides (with little or no moisture content) of the composition has a glass transition temperature ($T_g$) ranging from 100° C. to 200° C., e.g., from 100° C. to 175° C. from 100° C. to 150° C., from 100° C. to 130° C., from 105° C. to 135° C., from 110° C. to 140° C., from 115° C. to 145° C., or from 120° C. to 150° C. In terms of upper limits, the $T_g$ of the amorphous polyamide can be less than 200° C., e.g., less than 175° C., less than 150° C. less than 145° C., less than 140° C., less than 135° C., less than 130° C., less than 125° C., less than 120° C., less than 115° C., less than 110° C., or less than 105° C. In terms of lower limits, the $T_g$ of the amorphous polyamide can be greater than 100° C., e.g., greater than 105° C., greater than 110° C., greater than 115° C., greater than 120° C., greater than 125° C., greater than 130° C., greater than 135° C., greater than 140° C., or greater than 145° C. In some embodiments, each amorphous polyamide of the composition independently has a $T_g$ ranging from 100° C. to 150° C. as described herein. Higher temperatures, e.g., greater than 150° C., and lower temperatures, e.g., less than 100° C., are also contemplated.

These ranges and limits are also applicable to the aforementioned low $T_g$ polymer.

In some embodiments, the high $T_g$ polymer has a $T_g$ ranging from 0° C. to 160° C., e.g., from 10° C. to 120° C., from 20° C. to 100° C., from 30° C. to 90° C., or from 40° C. to 90° C. In terms of upper limits, the high $T_g$ polymer may have a $T_g$ less than 160° C., e.g., less than 140° C., less than 120° C., less than 100° C., less than 90° C., less than 80° C., or less than 70° C. In terms of lower limits, the high $T_g$ polymer may have a $T_g$ greater than 0° C., e.g., greater than 10° C., greater than 20° C., greater than 30° C., greater than 40° C., greater than 50° C., or greater than 60° C.

In some embodiments, at least one of the amorphous polyamides of the composition has a flexural/tensile modulus ranging from 2.6 GPa to 3.2 GPa, e.g., from 2.6 GPa to 2.96 GPa, from 2.66 GPa to 3.02 GPa, from 2.72 GPa to 3.08 GPa, from 2.78 GPa to 3.14 GPa, or from 2.84 GPa to 3.2 GPa. In terms of upper limits, the amorphous polyamide tensile modulus can be less than 3.2 GPa, e.g., less than 3.14 GPa, less than 3.08 GPa, less than 3.02 GPa, less than 2.96 GPa, less than 2.9 GPa, less than 2.84 GPa, less than 2.78 GPa, less than 2.72 GPa, or less than 2.66 GPa. In terms of lower limits, the amorphous polyamide flexural modulus can be greater than 2.6 GPa, e.g., greater than 2.66 GPa, greater than 2.72 GPa, greater than 2.78 GPa, greater than 2.84 GPa, greater than 2.9 GPa, greater than 2.96 GPa, greater than 3.02 GPa, greater than 3.08 GPa, or greater than 3.14 GPa. In some embodiments, each amorphous polyamide of the composition independently has a tensile modulus ranging from 2.6 GPa to 3.2 GPa as described herein. Higher tensile moduli, e.g., greater than 3.2 GPa, and lower tensile moduli, e.g., less than 2.6 GPa, are also contemplated.

In some embodiments, at least one of the amorphous polyamides of the composition has a density ranging from 1.16 g/cm$^3$ to 1.21 g/cm$^3$, e.g., from 1.17 g/cm$^3$ to 1.19 g/cm$^3$, from 1.165 g/cm$^3$ to 1.195 g/cm$^3$, from 1.17 g/cm$^3$ to 1.2 g/cm$^3$, from 1.175 g/cm$^3$ to 1.205 g/cm$^3$, or from 1.118 g/cm$^3$ to 1.21 g/cm$^3$. In terms of upper limits, the amorphous polyamide density can be less than 1.21 g/cm$^3$, e.g., less than 1.205 g/cm$^3$, less than 1.2 g/cm$^3$, less than 1.195 g/cm$^3$, less than 1.19 g/cm$^3$, less than 1.185 g/cm$^3$, less than 1.18 g/cm$^3$, less than 1.175 g/cm$^3$, less than 1.17 g/cm$^3$, or less than 1.165 g/cm$^3$. In terms of lower limits, the amorphous polyamide density can be greater than 1.16 g/cm$^3$, e.g., greater than 1.165 g/cm$^3$, greater than 1.17 g/cm$^3$, greater than 1.175 g/cm$^3$, greater than 1.18 g/cm$^3$, greater than 1.185 g/cm$^3$, greater than 1.19 g/cm$^3$, greater than 1.195 g/cm$^3$, greater than 1.2 g/cm$^3$, or greater than 1.205 g/cm$^3$. In some embodiments, each amorphous polyamide of the composition independently has a density ranging from 1.16 g/cm$^3$ to 1.21 g/cm$^3$ as described herein. Higher densities, e.g., greater than 1.21 g/cm$^3$, and lower densities, e.g., less than 1.16 g/cm$^3$, are also contemplated.

DT/DI

In some cases, the amorphous polyamide comprises polyamide blends with MPMD-T/MPMD-I, e.g., DT/DI. In some cases, the use of DT/DI has been particularly advantageous. Without being bound by theory, the $T_g$ of the DT/DI works synergistically in the polyamide composition (with the semi-crystalline polyamide). In some cases, DT/DI may be used in lesser amounts (vs. some other amorphous polyamides), while still achieving similar or better NVH performance. Beneficially, It has also been found that lesser amounts of DT/DI, e.g., those disclosed herein, may be needed to provide the desired NVH improvements. Thus, greater amounts of higher performance polymers can be employed, which surprisingly results in advantageous mechanical performance increases (along with the NVH improvements). The DT/DI may be present in the aforementioned amounts.

Exemplary DT/DI-based amorphous polyamide commercial products suitable for use in the provided composition include SVPx-129 Novadyn DT/DI from Shakespeare.

Semi-Crystalline Polyamide

The number of distinct species of semi-crystalline polyamides in the composition can be, for example, one, two, three, four, five, six, seven, eight, nine, ten, or more than ten. In some embodiments, the one or more semi-crystalline polyamides of the composition include PA66 polyamide, PA6 polyamide, PA66/6 polyamide, or PA66/6I polyamide, or combinations thereof.

As used herein, the terms "PA66," "nylon 66," and "polyamide 66" refer to a homopolymer prepared from hexamethylene diamine and adipic acid monomer subunits. A PA66 polyamide may be a polyamide that contains a significant portion of PA66 units in the polymer backbone, e.g., at least 5 wt %, at least 10 wt %, at least 20 wt %, at least 30 wt %, at least 40 wt %, at least 50 wt %, at least 60 wt %, at least 70 wt %, at least 8-0 wt % or at least 90 wt. As used herein, the terms "PA6," "nylon 6," and "polyamide 6" refer to a homopolymer prepared from caprolactam monomer subunits. As used herein, the terms "PA66/6," "nylon 66/6," and "polyamide 66/6" refer to a copolymer prepared from hexamethylene diamine and adipic acid monomer subunits and also incorporating caprolactam monomer subunits. As used herein, the terms "PA66/6I," "nylon 66/6I," and "polyamide 66/6I" refer to a copolymer prepared from hexamethylene diamine and adipic acid monomer subunits and also incorporating isophthalic acid monomer subunits.

The semi-crystalline polyamides of the composition can include, for example, PA66; PA6; PA66/6; PA66/6T; PA66/6I; PA66/6C; PA9T; PA10T; PA12T; or PA-6T/9T; or combinations or copolymers thereof. This listing is not meant to limit the scope of the semi-crystalline polyamides.

Exemplary combinations include PA66 and PA6; PA66 and PA66/6; PA66 and PA66/6I; PA6 and PA66/6; PA6 and PA66/6I; PA6 and PA66/6C; PA66/6 and PA66/6I; PA66, PA6, and PA66/6; PA66, PA6, PA66/6C; and PA66, PA66/6, PA66/6C and PA66/6I; or PA66, PA6, PA66/6, and PA66/6I.

In some embodiments, the concentrations of the one or more semi-crystalline polyamides ranges from 30 wt % to 80 wt %, e.g., from 30 wt % to 60 wt %, from 31 wt % to 63 wt %, from 35 wt % to 65 wt %, from 31 wt % to 55 wt %, from 40 wt % to 70 wt %, from 45 wt % to 75 wt %, or from 50 wt % to 80 wt %. In terms of upper limits, the semi-crystalline polyamide concentration can be less than 80 wt %, e.g., less than 75 wt %, less than 70 wt %, less than 65 wt %, less than 60 wt %, less than 55 wt %, less than 50 wt %, less than 45 wt %, less than 40 wt %, or less than 35 wt %. In terms of lower limits, the semi-crystalline polyamide concentration can be greater than 30 wt %, e.g., greater than 35 wt %, greater than 40 wt %, greater than 45 wt %, greater than 50 wt %, greater than 55 wt %, greater than 60 wt %, greater than 65 wt %, greater than 70 wt %, or greater than 75 wt %. Higher concentrations, e.g., greater than 80 wt %, and lower concentrations, e.g., less than 30 wt %, are also contemplated.

In some embodiments, the concentrations of the one or more semi-crystalline polyamides, e.g., PA66, ranges from 10 wt % to 70 wt %, e.g., from 15 wt % to 60 wt %, from 15 wt % to 50 wt %, from 20 wt % to 45 wt %, from 30 wt % to 45 wt %, from 25 wt % to 40 wt %, from 30 wt % to 40 wt %, or from 30 wt % to 37 wt %. In terms of upper limits, the semi-crystalline polyamide concentration can be less than 70 wt %, e.g., less than 65 wt %, less than 60 wt %, less than 65 wt %, less than 55 wt %, less than 50 wt %, less than 45 wt %, less than 40 wt %, or less than 37 wt %. In terms of lower limits, the semi-crystalline polyamide concentration can be greater than 10 wt %, e.g., greater than 15 wt %, greater than 20 wt %, greater than 25 wt %, greater than 27 wt %, greater than 30 wt %, or greater than 31 wt %. Higher concentrations, e.g., greater than 70 wt %, and lower concentrations, e.g., less than 10 wt %, are also contemplated.

PA66/6 (Co)Polyamide

PA66/6 (co)polyamide is an example of a semi-crystalline polymer, and it may be employed as discussed herein.

In an aspect, a polyamide composition including the other aforementioned semi-crystalline polyamide as well as a semi-crystalline PA66/6 copolyamide is disclosed. In some cases, the composition further includes PA66/6 copolyamide and: 1) a second semi-crystalline polyamide, or 2) an amorphous polyamide. The polyamide composition has been found to provide for surprising improvements as noted above. For example, the composition exhibits a maximum viscoelastic loss factor (tan(δ)) at high temperatures, e.g., above 40° C. or above 72° C., when the composition has a moisture content less than 0.2 wt %.

In some embodiments, the concentration of the semi-crystalline PA66/6 copolyamide in the composition ranges from 1 wt % to 50 wt %, e.g., from 5 wt % to 40 wt %, from 5 wt % to 30 wt %, from 7 wt % to 30 wt %, from 7 wt % to 25 wt %, or from 10 wt % to 20 wt %. In terms of upper limits, the PA66/6 copolyamide concentration can be less than 50 wt %, e.g., less than 40 wt %, less than 35 wt %, less than 30 wt %, less than 25 wt %, less than 20 wt %, or less than 17 wt %. In terms of lower limits, the PA66/6 copolyamide concentration can be greater than 5 wt %, e.g., greater than 7 wt %, greater than 9 wt %, greater than 10 wt %, greater than 12 wt %, greater than 13 wt %, or greater than 14 wt %. Higher concentrations, e.g., greater than 70 wt %, and lower concentrations, e.g., less than 30 wt %, are also contemplated.

In some embodiments, the concentration of the semi-crystalline PA66/6 copolyamide ranges from 4 wt % to 32 wt %, e.g., from 4 wt % to 20.8 wt %, from 6.8 wt % to 23.6 wt %, from 9.6 wt % to 26.4 wt %, from 12.4 wt % to 29.2 wt %, or from 15.2 wt % to 32 wt %. In terms of upper limits, the semi-crystalline PA66/6 copolyamide concentration can be less than 32 wt %, e.g., less than 29.2 wt %, less than 26.4 wt %, less than 23.6 wt %, less than 20.8 wt %, less than 18 wt %, less than 15.2 wt %, less than 12.4 wt %, less than 9.6 wt %, or less than 6.8 wt %. In terms of lower limits, the semi-crystalline PA66/6 copolyamide concentration can be greater than 4 wt %, e.g., greater than 6.8 wt %, greater than 9.6 wt %, greater than 12.4 wt %, greater than 15.2 wt %, greater than 18 wt %, greater than 20.8 wt %, greater than 23.6 wt %, greater than 26.4 wt %, or greater than 29.2 wt %. Higher concentrations, e.g., greater than 32 wt %, and lower concentrations, e.g., less than 4 wt %, are also contemplated.

PA66/6I

PA66/6I is an example of a semi-crystalline polymer, and it may be employed as discussed herein. In another aspect, a polyamide composition including semi-crystalline PA66/6I copolyamide is disclosed. The polyamide composition has been found to provide for surprising improvements in high temperature damping. For example, the compositions exhibit a maximum viscoelastic loss factor (tan(δ)) at a temperature above 72° C. when the composition has a moisture content less than 0.2 wt %.

In some embodiments, the concentration of the semi-crystalline PA66/6I copolyamide in the composition ranges from 30 wt % to 70 wt %, e.g., from 30 wt % to 54 wt %, from 34 wt % to 58 wt %, from 38 wt % to 62 wt %, from 46 wt % to 55 wt %, from 42 wt % to 66 wt %, or from 46 wt % to 70 wt %. In terms of upper limits, the PA66/6I concentration can be less than 70 wt %, e.g., less than 66 wt %, less than 62 wt %, less than 58 wt %, less than 54 wt %, less than 50 wt %, less than 46 wt %, less than 42 wt %, less than 38 wt %, or less than 34 wt %. In terms of lower limits, the PA66/6I concentration can be greater than 30 wt %, e.g., greater than 34 wt %, greater than 38 wt %, greater than 42 wt %, greater than 46 wt %, greater than 50 wt %, greater than 54 wt %, greater than 58 wt %, greater than 62 wt %, or greater than 66 wt %. Higher concentrations, e.g., greater than 70 wt %, and lower concentrations, e.g., less than 30 wt %, are also contemplated.

In some embodiments, the composition includes a PA66/6I polyamide having an isophthalic acid content ranging from 5 mol % to 30 mol %, e.g., from 5 mol % to 20 mol %, from 7.5 mol % to 22.5 mol %, from 10 mol % to 25 mol %, from 12.5 mol % to 27.5 mol %, or from 15 mol % to 30 mol %. In terms of upper limits, the isophthalic acid content of the PA66/6I polyamide can be less than 30 mol %, e.g., less than 27.5 mol %, less than 25 mol %, less than 22.5 mol %, less than 20 mol %, less than 17.5 mol %, less than 15 mol %, less than 12.5 mol %, less than 10 mol %, or less than 7.5 mol %. In terms of lower limits, the isophthalic acid content of the PA66/6I polyamide can be greater than 5 mol %, e.g., greater than 7.5 mol %, greater than 10 mol %, greater than 12.5 mol %, greater than 15 mol %, greater than 17.5 mol %, greater than 20 mol %, greater than 22.5 mol %, greater than 25 mol %, or greater than 27.5 mol %. In some embodiments, each PA66/6I polyamide of the composition independently has an isophthalic acid content ranging from 5 mol % to 30 mol % as disclosed herein. Higher contents, e.g., greater than 30 mol %, and lower contents, e.g., less than 5 mol %, are also contemplated.

In some embodiments, the ratio of the combined weight of the one or more semi-crystalline polyamides in the composition to the combined weight of the one or more amorphous polyamides in the composition ranges from 0.01:1 to 20:1, e.g., from 0.05:1 to 18:1; from 0.05:1 to 15:1, from 0.06:1 to 13:1, from 0.1:1 to 13:1, from 0.5:1 to 12:1, from 0.75:1 to 12:1, from 1:1 to 13:1, from 1:1 to 4.7:1, from 1.3:1 to 6:1, from 1.7:1 to 7.8:1, from 2.2:1 to 10:1, or from 2.8:1 to 13:1. In terms of upper limits, the ratio of the semi-crystalline polyamide weight to the amorphous polyamide weights can be less than 20:1, e.g., less than 18:1, less than 15:1, less than 10:1, less than 7.8:1, less than 6:1, less than 4.7:1, less than 3.6:1, less than 2.8:1, less than 2.2:2, less than 1.7:1, or less than 1.3:1. In terms of lower limits, the ratio of the semi-crystalline polyamide weights to the amorphous polyamide weights can be greater than 0.01:1, e.g., greater than 0.05:1, greater than 0.06:1, greater than 0.1:1, greater than 0.5:1, greater than 0.75:1, greater than 1:1, greater than 1.3:1, greater than 1.7:1, greater than 2.2:1, greater than 2.8:1, greater than 3.6:1, greater than 4.7:1, greater than 6:1, greater than 7.8:1, or greater than 10:1. Higher ratios, e.g., greater than 13:1, and lower ratios, e.g., less than 1:1, are also contemplated. These ranges and limits apply to the semi-crystalline polyamide and the amorphous polyamide generally, and individually, e.g., PA66/6I or PA66/6C.

PA66/6C

PA66/6C is an example of a semi-crystalline polymer, and it may be employed as discussed herein. In some embodiments, a polyamide composition including semi-crystalline PA66/6C copolymer is disclosed. In some cases, the semi-crystalline polyamide (of the polyamide composition) comprises PA66/6C. The PA66/6C may be employed alone or in combination with additional the semi-crystalline polyamides, examples of which are disclosed herein.

In some cases, the polyamide composition has been found to provide for surprising improvements in high temperature damping. For example, the compositions exhibit a maximum viscoelastic loss factor (tan(δ)) at the aforementioned temperatures when the composition has a moisture content less than 0.2 wt %.

It has been found that the semi-crystalline polyamide, e.g., PA66/6C, synergistically interacts with the amorphous polyamide. For example, the semi-crystalline polyamide advantageously balances, e.g., reduces, some effects of the amorphous polyamide. The combination of the semi-crystalline polyamide and the amorphous polyamide, e.g., PA66/6C, surprisingly provides for improvements in both NVH performance and mechanical properties, e.g., stiffness.

In some cases, the semi-crystalline polyamide has been found to improve the reduction in stiffness properties, e.g., tensile modulus, that may be associated with amorphous polymer content. This unexpected improvement may be particularly evident when measured at (operating) temperature, e.g., temperatures at which the polyamide composition is employed.

It has also been found that, when some semi-crystalline polyamides, e.g., PA66/6C, are utilized, lesser amounts of semi-crystalline polyamide, e.g., the lesser amounts disclosed herein, may be needed to provide the desired improvements. Thus, greater amounts of higher performance polymers can be employed, which surprisingly results in advantageous mechanical performance increases.

Without being bound by theory, it is postulated that the non-aromatic (planar) structure of PA66/6C allows it to better crystallize/co-crystallize with the acids of the other polyamides, e.g., adipic acid, more so than with some aromatic polyamides, which do not have such a planar structure and as such are less likely to crystallize/co-crystallize with acids. This crystallization is believed to provide for the aforementioned synergistic performance benefits (provided by the combination of semi-crystalline polyamide and amorphous polyamide).

In some embodiments, the concentrations of the PA66/6C, ranges from 10 wt % to 70 wt %, e.g., from 15 wt % to 60 wt %, from 15 wt % to 50 wt %, from 20 wt % to 45 wt %, from 25 wt % to 40 wt %, from 25 wt % to 30 wt %, from 30 wt % to 40 wt %, from 30 wt % to 37 wt %, or from 28 wt % to 35 wt %. In terms of upper limits, the PA66/6C concentration can be less than 70 wt %, e.g., less than 65 wt %, less than 60 wt %, less than 65 wt %, less than 55 wt %, less than 50 wt %, less than 45 wt %, less than 40 wt %, less than 37 wt %, or less than 35 wt %. In terms of lower limits, the PA66/6C concentration can be greater than 10 wt %, e.g., greater than 15 wt %, greater than 20 wt %, greater than 25 wt %, greater than 27 wt %, greater than 28 wt %, greater than 30 wt %, or greater than 31 wt %. Higher concentrations, e.g., greater than 70 wt %, and lower concentrations, e.g., less than 10 wt %, are also contemplated.

Other Additives

In some embodiments, the polymer composition can optionally include one or more additive(s). In some embodiments, the additives comprise one or more of catalyst, polymers other than polyamide, adhesion promoters, ions, compounds, preservatives such as heat stabilizers and antioxidants, lubricants, flow enhancers, or other ingredients as known in the art. The additive(s) may include at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, reinforcing agents, e.g., fibrous materials and particulate fillers. These components may be considered optional. In some cases, the disclosed compositions may expressly exclude one or more of the aforementioned additives in this section, e.g., via claim language. This is contemplated herein. For example, the disclosed composition may exclude a flame retardant and/or reinforcing agents (or any other of the aforementioned additives). This provides support for express exclusion of one or more of these components in claim language.

In some embodiments, the provided composition includes one more heat stabilizers. The one or more heat stabilizers of the composition can be selected to improve performance, e.g., at higher operating temperatures, without significantly negatively affecting the strength or other thermal properties of the material. At least one of the heat stabilizers can include copper. In some embodiments, all heat stabilizers of the film include copper. Copper stabilizers suitable for use as components of the provided film include copper halides, e.g., chlorides, bromides, or iodides, or combinations thereof. Copper stabilizers also can include copper cyanide, copper oxide, copper sulfate, copper phosphate, copper acetate, copper propionate, copper benzoate, copper adipate, copper terephthalate, copper isophthalate, copper salicylate, copper nicotinate, copper stearate, or copper complex salts coordinated to a chelating amine such as ethylenediamine and ethylenediaminetetraacetic acid, or combinations thereof.

In some embodiments, the combined concentration of the one or more heat stabilizers of the composition ranges from 0.1 wt % to 2 wt %, e.g., from 0.1 wt % to 0.6 wt %, from 0.13 wt % to 0.81 wt %, from 0.18 wt % to 1.1 wt %, from 0.25 wt % to 1.5 wt %, or from 0.33 wt % to 2 wt %. In terms of upper limits, the heat stabilizer concentration can be less than 2 wt %, e.g., less than 1.5 wt %, less than 1.1 wt %, less than 0.81 wt %, less than 0.6 wt %, less than 0.45 wt %, less than 0.33 wt %, less than 0.25 wt %, less than 0.18 wt %, or less than 0.13 wt %. In terms of lower limits, the heat stabilizer concentration can be greater than 0.1 wt %, e.g., greater than 0.13 wt %, greater than 0.18 wt %, greater than 0.25 wt %, greater than 0.33 wt %, greater than 0.45 wt %, greater than 0.6 wt %, greater than 0.81 wt %, greater than 1.1 wt %, or greater than 1.5 wt %. Higher concentrations, e.g., greater than 2 wt %, and lower concentrations, e.g., less than 0.1 wt %, are also contemplated.

In some embodiments, the provided composition includes one or more lubricants selected to serve as processing aids. The type and relative amount of lubricant can be selected to improve processing of the composition, and to contribute to the high strength of the material. In some embodiments, the lubricant includes a wax. In some embodiments, the lubricant consists of a wax. In some embodiments, the wax includes a fatty acid. In some embodiments, the lubricant consists of a fatty acid. In some embodiments, the wax includes a saturated fatty acid. In some embodiments, the lubricant consists of a saturated fatty acid. In some embodiments, the wax includes stearic acid, behenic acid, or salts or combinations thereof. In some embodiments, the lubricant consists of stearic acid, behenic acid, or salts or combinations thereof. The stearate lubricant can include, for example, zinc stearate calcium stearate, aluminum distearate, zinc stearate, and/or calcium stearate.

In some embodiments, the combined concentration of the one or more lubricants of the composition ranges from 0.1 wt % to 2 wt %, e.g., from 0.1 wt % to 0.6 wt %, from 0.13 wt % to 0.81 wt %, from 0.18 wt % to 1.1 wt %, from 0.25 wt % to 1.5 wt %, or from 0.33 wt % to 2 wt %. In terms of upper limits, the lubricant concentration can be less than 2 wt %, e.g., less than 1.5 wt %, less than 1.1 wt %, less than 0.81 wt %, less than 0.6 wt %, less than 0.45 wt %, less than 0.33 wt %, less than 0.25 wt %, less than 0.18 wt %, or less than 0.13 wt %. In terms of lower limits, the lubricant concentration can be greater than 0.1 wt %, e.g., greater than 0.13 wt %, greater than 0.18 wt %, greater than 0.25 wt %, greater than 0.33 wt %, greater than 0.45 wt %, greater than 0.6 wt %, greater than 0.81 wt %, greater than 1.1 wt %, or greater than 1.5 wt %. Higher concentrations, e.g., greater than 2 wt %, and lower concentrations, e.g., less than 0.1 wt %, are also contemplated.

In some embodiments, the provided composition includes one or more reinforcing agents, e.g., mineral reinforcements or fiber reinforcements or a combination thereof. The reinforcing agents can be selected to further enhance the strength characteristics of the composition without compromising the desired compositional thermal properties. The material of the filler is not particularly limited and may be selected from polyamide fillers known in the art. By way of non-limiting example, the filler may comprise glass- and/or carbon fibers, particulate fillers, such as mineral fillers based on natural and/or synthetic layer silicates, talc, mica, silicate, quartz, titanium dioxide, wollastonite, kaolin, amorphous silicic acids, magnesium carbonate, magnesium hydroxide, chalk, lime, feldspar, barium sulphate, KEVLAR® fiber, basalt fiber, solid or hollow glass balls or ground glass, permanently magnetic or magnetisable metal compounds and/or alloys and/or combinations thereof, and also combinations thereof.

In some embodiments, the combined concentration of the one or more reinforcing agents of the composition ranges from 15 wt % to 60 wt %, e.g., from 15 wt % to 42 wt %, from 19.5 wt % to 46.5 wt %, from 24 wt % to 51 wt %, from 28.5 wt % to 55.5 wt %, or from 33 wt % to 60 wt %. In terms of upper limits, the reinforcing agent concentration can be less than 60 wt %, e.g., less than 55.5 wt %, less than 51 wt %, less than 46.5 wt %, less than 42 wt %, less than 37.5 wt %, less than 33 wt %, less than 28.5 wt %, less than 24 wt %, or less than 19.5 wt %. In terms of lower limits, the reinforcing agent can be greater than 15 wt %, e.g., greater than 19.5 wt %, greater than 24 wt %, greater than 28.5 wt %, greater than 33 wt %, greater than 37.5 wt %, greater than 42 wt %, greater than 46.5 wt %, greater than 51 wt %, or greater than 55.5 wt %. Higher concentrations, e.g., greater than 60 wt %, and lower concentrations, e.g., less than 15 wt %, are also contemplated.

In other cases, the polyamide compositions is a "neat" composition, e.g., the polyamide composition comprises little or no filler. For example the polyamide compositions may comprise less than 20 wt % filler, e.g., less than 17 wt %, less than 15 wt %, less than 10 wt %, or less than 5 wt %. In terms of ranges, the polyamide compositions may comprise from 0.01 wt % to 20 wt % filler, e.g., from 0.1 wt % to 15 wt % or from 0.1 wt % to 5 wt %. In such cases, the amounts of other components may be adjusted accordingly based on the aforementioned component ranges and limits. It is contemplated that a person of ordinary skill in the art would be able to adjust the concentration of the other components of the polyamide composition in light of the inclusion or exclusion of a glass filler.

Performance Characteristics

An advantage of the compositions disclosed herein is that they are surprisingly capable of simultaneously providing both effective damping performance and strong mechanical performance at high operating temperatures, e.g., temperatures above 72° C. For reasons discussed above, it is challenging for conventional polyamide compositions to simultaneously provide these different performance characteristics under such temperature conditions.

Since polyamides are hygroscopic and tend to absorb moisture, and performance characteristics of polyamide compositions can vary based on composition moisture content, performance characteristics can be described under a defined moisture content that reflects the operating conditions anticipated for a particular classification of end use. For example, performance characteristics can be characterized with a moisture content below 0.2% by weight.

One measure of the damping performance of the provided compositions is the temperature at which the viscoelastic loss factor (tan(δ)) exhibits its peak. In general, the higher the temperature of this maximum, the more effective the composition is at damping and isolating vibration and noise at higher temperatures. Viscoelastic loss factors can be measured with, for example, the standard test methods in compliance with ISO 6721-1 (2019) and ASTM D5023-15 (2015).

In some embodiments, when the provided composition has a moisture content less than 0.2 wt %, the composition exhibits a maximum tan(δ) at a temperature ranging from 40° C. to 140° C., from 50° C. to 140° C., from 50° C. to 120° C., from 60° C. to 115° C., from 72° C. to 110° C., from 73° C. to 103° C., e.g., from 73° C. to 91° C., from 76° C. to 94° C., from 79° C. to 97° C., from 82° C. to 100° C., or from 85° C. to 103° C. The composition can exhibit a maximum tan(δ) at a temperature ranging from 75° C. to 95° C., e.g., from 75° C. to 87° C., from 77° C. to 89° C., from 79° C. to 91° C., from 81° C. to 93° C., or from 83° C. to 95° C. In terms of upper limits, the maximum tan(δ) can be exhibited at a temperature less than 140° C., e.g., less than 130° C., less than 120° C., less than 115° C., less than 110° C., less than 105° C., less than 103° C., less than 100° C., less than 97° C., less than 95° C., less than 93° C., less than 91° C., less than 89° C., less than 87° C., less than 85° C., less than 83° C., less than 81° C., less than 79° C., less than 77° C., or less than 75° C. In terms of lower limits, the maximum tan(δ) can be exhibited at a temperature greater than 40° C., e.g., greater than 42° C., greater than 50° C., greater than 55° C., greater than 60° C., greater than 65° C., greater than 70° C., greater than 72° C., greater than 73° C., greater than 75° C., greater than 77° C., greater than 79° C., greater than 81° C., greater than 83° C., greater than 85° C., greater than 87° C., greater than 89° C., greater than 91° C., greater than 93° C., greater than 95° C., greater than 97° C., or greater than 100° C. Higher maximum tan(δ) temperatures, e.g., greater than 103° C., are also contemplated.

In some embodiments, when the composition has a moisture content less than 0.2 wt %, the composition exhibits a maximum tan(δ) value ranging, for example, from 0.01 to 0.275, e.g., from 0.01 to 0.245, from 0.03 to 0.245, from 0.05 to 0.245, from 0.057 to 0.245, from 0.07 to 0.245, from 0.095 to 0.245, from 0.095 to 0.185, from 0.11 to 0.2, from 0.125 to 0.215, from 0.14 to 0.23, or from 0.155 to 0.245. The composition can exhibit a maximum tan (δ) value ranging from 0.095 to 0.15, e.g., from 0.095 to 0.128, from 0.1005 to 0.1335, from 0.106 to 0.139, from 0.1115 to 0.1445, or from 0.117 to 0.15. In terms of upper limits, the maximum tan(δ) value can be less than 0.275, e.g., less than 0.265, less than 0.245, less than 0.23, less than 0.215, less than 0.2, less than 0.185, less than 0.17, less than 0.155, less than 0.15, less than 0.1445, less than 0.139, less than 0.1335, less than 0.128, less than 0.1225, less than 0.117, less than 0.1115, less than 0.106, or less than 0.1005. In terms of lower limits, the maximum tan(δ) value can be greater than 0.01, e.g., greater than 0.03, greater than 0.05, greater than 0.095, greater than 0.1005, greater than 0.106, greater than 0.1115, greater than 0.117, greater than 0.1225, greater than 0.128, greater than 0.1335, greater than 0.139, greater than 0.1445, greater than 0.15, greater than 0.155, greater than 0.17, greater than 0.185, greater than 0.2, greater than 0.215, or greater than 0.23. Higher maximum tan(δ) values, e.g., greater than 0.245, are also contemplated.

The heat distortion temperature (HDT) of a polymeric material is the temperature at which the material begins to soften and distort when exposed to a fixed load. Heat distortion temperatures can be measured with, for example, the standard test method ISO 75-2/A (2013). In some embodiments, when the composition has a moisture content less than 0.2 wt %, the composition exhibits an HDT at 1.82 MPa ranging from 185° C. to 255° C., e.g., from 185° C. to 227° C., from 192° C. to 234° C., from 199° C. to 241° C., from 206° C. to 248° C., or from 213° C. to 255° C. In terms of upper limits, the HDT can be less than 255° C., e.g., less than 248° C., less than 241° C., less than 234° C., less than 227° C., less than 220° C., less than 213° C., less than 206° C., less than 199° C., or less than 192° C. In terms of lower limits, the HDT can be greater than 185° C., e.g., greater than 192° C., greater than 199° C., greater than 206° C., greater than 213° C., greater than 220° C., greater than 227° C., greater than 234° C., greater than 241° C., or greater than 248° C. Higher temperatures, e.g., greater than 255° C., and lower temperatures, e.g., less than 185° C., are also contemplated.

The melting temperature ($T_m$) of a polymeric material is the temperature at which the material undergoes a phase transition from crystallinity. Melting temperatures can be measured with, for example, the standard test method ISO 11357-3 (2018). In some embodiments, when the composition has a moisture content less than 0.2 wt %, the composition exhibits a $T_m$ ranging from 205° C. to 285° C., e.g., from 205° C. to 253° C., from 213° C. to 261° C., from 221° C. to 269° C., from 229° C. to 277° C., or from 237° C. to 285° C. In terms of upper limits, the $T_m$ can be less than 285° C., e.g., less than 277° C., less than 269° C., less than 261° C., less than 253° C., less than 245° C., less than 237° C., less than 229° C., less than 221° C., or less than 213° C. In terms of lower limits, the $T_m$ can be greater than 205° C., e.g., greater than 213° C., greater than 221° C., greater than 229° C., greater than 237° C., greater than 245° C., greater than 253° C., greater than 261° C., greater than 269° C., or greater than 277° C. Higher temperatures, e.g., greater than 285° C., and lower temperatures, e.g., less than 205° C., are also contemplated.

The difference between the HDT and $T_m$ of a polymeric material can indicate the effect of reinforcing agents or other additives on the thermal performance of the material, and have implications for the processability of the material. The difference between the HDT and the $T_m$ of the provided composition when the composition has a moisture content less than 0.2 wt % can range, for example, from 1° C. to 100° C., e.g., from 5° C. to 95° C., from 5° C. to 80° C., from 5° C. to 65° C., from 10° C. to 60° C., from 15° C. to 60° C., from 15° C. to 50° C., from 15° C. to 45° C., from 15° C. to 35° C., from 15° C. to 27° C., from 17° C. to 29° C., from 19° C. to 31° C., from 21° C. to 33° C., or from 23° C. to 35° C. The difference between the HDT and the $T_m$ of the composition can range from 20° C. to 30° C., e.g., from 20° C. to 26° C., from 21° C. to 27° C., from 22° C. to 28° C., from 23° C. to 29° C. or from 24° C. to 30° C. In terms of upper limits, the difference between the HDT and $T_m$ can be less than 100° C., e.g., less than 95° C., less than 90° C., less than 85° C., less than 80° C., less than 75° C., less than 70° C., less than 65° C., less than 55° C., less than 50° C., less than 45° C., less than 40° C., less than 35° C., less than 33° C., less than 31° C., less than 30° C., less than 29° C., less than 28° C., less than 27° C., less than 26° C., less than 25° C., less than 24° C., less than 23° C., less than 22° C., less than 21° C., less than 20° C., less than 19° C., or less than 17° C. In terms of lower limits, the difference between the HDT and the $T_m$ can be greater than 1° C., greater than 3C, greater than 5° C., greater than 7° C., greater than 10° C., greater than 15° C., greater than 17° C., greater than 19° C., greater than 20° C., greater than 21° C., greater than 22° C., greater than 23° C., greater than 24° C., greater than 25° C., greater than 26° C., greater than 27° C., greater than 28° C., greater than 29° C., greater than 30° C., greater than 31° C., or greater than 33° C. Smaller differences, e.g., less than 15° C., are also contemplated.

In some embodiments, the polymeric composition demonstrates a center point beam tan(δ) value ranging from 0.095 to 0.245. This center point beam tan(δ) value can provide a good measure of the damping performance of the composition because it quantifies tan(δ) value across a broad operating frequency spectrum, e.g., from 1 Hz to 4000 Hz. The center point beam tan(δ) value can range, for example, from 0.095 to 0.185, from 0.11 to 0.2, from 0.125 to 0.215, from 0.14 to 0.23, or from 0.155 to 0.245. The center point beam tan (6) value can range from 0.095 to 0.15, e.g., from 0.095 to 0.128, from 0.1005 to 0.1335, from 0.106 to 0.139, from 0.1115 to 0.1445, or from 0.117 to 0.15. In terms of upper limits, the center point beam tan(δ) value can be less than 0.245, e.g., less than 0.23, less than 0.215, less than 0.2, less than 0.185, less than 0.17, less than 0.155, less than 0.15, less than 0.1445, less than 0.139, less than 0.1335, less than 0.128, less than 0.1225, less than 0.117, less than 0.1115, less than 0.106, or less than 0.1005. In terms of lower limits, the center point beam tan(δ) value can be greater than 0.095, e.g., greater than 0.1005, greater than 0.106, greater than 0.1115, greater than 0.117, greater than 0.1225, greater than 0.128, greater than 0.1335, greater than 0.139, greater than 0.1445, greater than 0.15, greater than 0.155, greater than 0.17, greater than 0.185, greater than 0.2, greater than 0.215, or greater than 0.23. Higher center beam point tan(δ) values, e.g., greater than 0.245, are also contemplated.

It can be beneficial for polymeric compositions to have high tensile strengths, e.g., because of the accompanying resistance of products manufactured from these compositions from failure resulting from tensile forces. The compositions disclosed herein can beneficially demonstrate no decrease in tensile strength relative to conventional polymer compositions that have not been modified for enhanced high temperature damping properties. Tensile strengths can be measured with, for example, the standard test method ASTM D882-18 (2018) or ISO 527-2 (2012).

In some embodiments, the provided compositions demonstrates a tensile strength ranging from 150 MPa to 255 MPa, e.g., from 150 MPa to 213 MPa, from 160.5 MPa to 223.5 MPa, from 171 MPa to 234 MPa, from 181.5 MPa to 244.5 MPa, or from 192 MPa to 255 MPa. The tensile strength of the composition can range from 185 MPa to 205 MPa, e.g., from 185 MPa to 197 MPa, from 187 MPa to 199 MPa, from 189 MPa to 201 MPa, from 191 MPa to 203 MPa, or from 193 MPa to 205 MPa. In terms of upper limits, the tensile strength can be less than 255 MPa, e.g., less than 244.5 MPa, less than 234 MPa, less than 223.5 MPa, less than 213 MPa, less than 205 MPa, less than 203 MPa, less than 201 MPa, less than 199 MPa, less than 197 MPa, less than 195 MPa, less than 193 MPa, less than 191 MPa, less than 189 MPa, less than 187 MPa, less than 185 MPa, less than 181.5 MPa, less than 171 MPa, or less than 160.5 MPa. In terms of lower limits, the tensile strength can be greater than 150 MPa, e.g., greater than 160.5 MPa, greater than 171 MPa, greater than 181.5 MPa, greater than 185 MPa, greater than 187 MPa, greater than 189 MPa, greater than 191 MPa, greater than 193 MPa, greater than 195 MPa, greater than 197 MPa, greater than 199 MPa, greater than 201 MPa, greater than 203 MPa, greater than 205 MPa, greater than 213 MPa, greater than 223.5 MPa, greater than 234 MPa, or greater than 244.5 MPa. Higher tensile strengths, e.g., greater than 255 MPa, and lower strengths, e.g., less than 150 MPa, are also contemplated.

The strength of a polymer composition can also be characterized in terms of its elongation properties. It can be beneficial for polymeric materials to have high elongation because products manufactured from these materials are often subjected to stretching forces that can cause a material with low elongation to tear or rupture. The compositions disclosed herein beneficially demonstrate no decrease in elongation relative to conventional polymer compositions that have not been modified for enhanced high temperature damping properties. Elongation can be measured with, for example, the standard test method ASTM D882-18 (2018).

In some embodiments, the provided composition exhibits an elongation at break ranging from 1.5% to 5%, e.g., from 1.5% to 3.6%, from 1.85% to 3.95%, from 2.2% to 4.3%, from 2.55% to 4.65%, or from 2.9% to 5%. In terms of upper limits, the elongation can be less than 5%, e.g., less than 4.65%, less than 4.3%, less than 3.95%, less than 3.6%, less than 3.25%, less than 2.9%, less than 2.55%, less than 2.2%, or less than 1.85%. In terms of lower limits, the elongation can be greater than 1.5%, e.g., greater than 1.85%, greater than 2.2%, greater than 2.55%, greater than 2.9%, greater than 3.25%, greater than 3.6%, greater than 3.95%, greater than 4.3%, or greater than 4.65%. Larger elongations, e.g., greater than 5%, and smaller elongations, e.g., less than 1.5%, are also contemplated.

The tensile modulus of a polymer composition is a measure of the resistance of the composition to stretching forces. It can be beneficial for polymeric compositions to have low tensile moduli, because a lower modulus can increase the elasticity of products manufactured from the compositions and render these products more amenable to processing steps that involve stretching or thermoforming. The compositions disclosed herein can beneficially demonstrate no increase in tensile moduli relative to conventional polymer compositions that have not been modified for enhanced high temperature damping properties. Tensile moduli can be measured with, for example, the standard test method ASTM D882-18 (2018).

In some embodiments, the provided composition exhibits a tensile modulus ranging from 9.5 GPa to 20.5 GPa, e.g., from 9.5 GPa to 16.1 GPa, from 10.6 GP to 17.2 GPa, from 11.7 GPa to 18.3 GPa, from 12.8 GPa to 19.4 GPa, or from 13.9 GPa to 20.5 GPa. In terms of upper limits, the tensile modulus can be less than 20.5 GPa, e.g., less than 19.4 GPa, less than 18.3 GPa, less than 17.2 GPa, less than 16.1 GPa, less than 15 GPa, less than 13.9 GPa, less than 12.8 GPa, less than 11.7 GPa, or less than 10.6 GPa. In terms of lower limits, the tensile modulus can be greater than 9.5 GPa, e.g., greater than 10.6 GPa, greater than 11.7 GPa, greater than 12.8 GPa, greater than 13.9 GPa, greater than 15 GPa, greater than 16.1 GPa, greater than 17.2 GPa, greater than 18.3 GPa, or greater than 19.4 GPa. Higher tensile moduli, e.g., greater than 20.5 GPa, and lower tensile moduli, e.g., less than 9.5 GPa, are also contemplated.

The impact strength of a polymer composition is a measure of the resistance of the composition to breakage by shock loading. The compositions disclosed herein can beneficially demonstrate no decrease in impact strength relative to conventional polymer compositions that have not been modified for enhanced high temperature damping properties. Impact strengths can be measured in terms of, for example, notched Charpy impact strengths or un-notched Charpy impact strengths using standard test method ISO 179 (2010).

In some embodiments, the provided composition exhibits a notched Charpy impact strength ranging from 7 $kJ/m^2$ to 15 $kJ/m^2$, e.g., from 7 $kJ/m^2$ to 11.8 $kJ/m^2$, from 7.8 $kJ/m^2$ to 12.6 $kJ/m^2$, from 8.6 $kJ/m^2$ to 13.4 $kJ/m^2$, from 9.4 $kJ/m^2$ to 14.2 $kJ/m^2$, or from 10.2 $kJ/m^2$ to 15 $kJ/m^2$. In terms of upper limits, the notched Charpy impact strength can be less than 15 $kJ/m^2$, e.g., less than 14.2 $kJ/m^2$, less than 13.4 $kJ/m^2$, less than 12.6 $kJ/m^2$, less than 11.8 $kJ/m^2$, less than 11 $kJ/m^2$, less than 10.2 $kJ/m^2$, less than 9.4 $kJ/m^2$, less than 8.6 $kJ/m^2$, or less than 7.8 $kJ/m^2$. In terms of lower limits, the notched Charpy impact strength can be greater than 7 $kJ/m^2$, e.g., greater than 7.8 $kJ/m^2$, greater than 8.6 $kJ/m^2$, greater than 9.4 $kJ/m^2$, greater than 10.2 $kJ/m^2$, greater than 11 $kJ/m^2$, greater than 11.8 $kJ/m^2$, greater than 12.6 $kJ/m^2$, greater than 13.4 $kJ/m^2$, or greater than 14.2 $kJ/m^2$. Higher strengths, e.g., greater than 15 $kJ/m^2$, and lower strengths, e.g., less than 7 $kJ/m^2$, are also contemplated.

In some embodiments, the provided composition exhibits an un-notched Charpy impact strength ranging from 50 $kJ/m^2$ to 100 $kJ/m^2$, e.g., from 50 $kJ/m^2$ to 80 $kJ/m^2$, from 55 $kJ/m^2$ to 85 $kJ/m^2$, from 60 $kJ/m^2$ to 90 $kJ/m^2$, from 65 $kJ/m^2$ to 95 $kJ/m^2$, or from 70 $kJ/m^2$ to 100 $kJ/m^2$. In terms of upper limits, the un-notched Charpy impact strength can be less than 100 $kJ/m^2$, e.g., less than 95 $kJ/m^2$, less than 90 $kJ/m^2$, less than 85 $kJ/m^2$, less than 80 $kJ/m^2$, less than 75 $kJ/m^2$, less than 70 $kJ/m^2$, less than 65 $kJ/m^2$, less than 60 $kJ/m^2$, or less than 55 $kJ/m^2$. In terms of lower limits, the un-notched Charpy impact strength can be greater than 50 $kJ/m^2$, e.g., greater than 55 $kJ/m^2$, greater than 60 $kJ/m^2$, greater than 65 $kJ/m^2$, greater than 70 $kJ/m^2$, greater than 75 $kJ/m^2$, greater than 80 $kJ/m^2$, greater than 85 $kJ/m^2$, greater than 90 $kJ/m^2$, or greater than 95 $kJ/m^2$. Higher strengths, e.g., greater than 100 $kJ/m^2$, and lower strengths, e.g., less than 50 $kJ/m^2$, are also contemplated.

The strength of a polymer composition can also be characterized in terms of its fatigue properties, e.g., tension fatigue or bearing fatigue. It can be beneficial for polymeric materials to have high fatigue resistance because products manufactured from these materials are often subjected to loads that can cause a material with low fatigue resistance to crack. The compositions disclosed herein beneficially demonstrate no decrease in fatigue resistance relative to conventional polymer compositions that have not been modified for enhanced high temperature damping properties.

Applications (Connecting Parts/Automotive Parts)

This disclosure also relates to articles and (connecting) parts made from the disclosed polymer compositions. The characteristics of the polyamide compositions provides for unexpected improvements in article/part performance. In some cases, the part is an connecting part and it may be used to connect one (automotive) component to another (automotive) component. For example the connecting parts may mount an engine to a chassis. The ability of the article/part (made from the disclosed NVH compositions) to effectively isolate vibrations (between a first and second component) results in quieted performance. And, the additional benefits of unexpected mechanical performance can also facilitate replacement of heavier structural pieces, which contributes to much-desired weight reduction.

Also, conventional connecting parts often employ conventional NVH-reducing pieces, e.g., rubber pieces, often together with multiple rigid structural (metal) pieces, to achieve suitable connecting and NVH performance. When the disclosed NVH compositions are used for connecting parts, this multiple-piece construction can be avoided, which eliminates the multiple pieces and improves manufacturing efficiency.

The disclosed connecting parts have been found to be particularly effective in the automotive arena. This is due, at least in part, to the ability of the compositions from which they are made to provide both NVH and mechanical performance, as discussed above.

In some embodiments, the disclosure relates to an (automotive) part that may be made from the disclosed polyamide compositions. Because of the aforementioned performance characteristics of the polyamide compositions, the resultant parts demonstrate surprising improvements in NVH performance balanced with mechanical performance.

In some cases, the connecting part comprises a part body (for contacting a first component) and a part tab (for connecting a second component). In use, the body is utilized to connect a component to one portion of an automobile while the tab mounts the component to another portion of the automobile. For example, the part may be an engine mount, and the body of the part is disposed between the engine block and the chassis. The body of the part may mount to the engine block and the tab may mount to the chassis. At least one of the part body and the part tab comprise (or are made from) the disclosed polyamide compositions.

Countless other parts are contemplated. In most cases, the part serves the purpose of connecting a component to another component, while providing the aforementioned unexpected improvements in NVH and mechanical performance. For example, the part may be an engine mount, e.g., for fuel or electric engines, a differential mount, a torque rod, a lined bushing, an HVAC compressor bracket, a strut mount, a shock absorber mount, a chassis mount, an accessory mount, e.g., water pump mount or compressor mount, or a transmission mount, or a combination thereof. In some cases the part may simply be an insert piece that can be added for NVH attenuation.

Although not required, the connecting part may further comprising a structural support piece. Structural support pieces are well known in the art. Particular examples include metal supports, e.g., aluminum or steel insert pieces.

The disclosure also relates to processes for connecting a first component to a second component using the connecting parts. The process may comprise the step of providing a connecting part comprising a part body and a part tab. The process further comprises the steps of contacting the part body with the first component and contacting the part tab with the second component to connect first and second components. The part exhibits the aforementioned performance benefits, which minimized NVH issues. In a particular, non-limiting case, the connecting part is an engine mount, the first component is an engine, and the second component is a chassis.

Methods

In another aspect, a method of preparing a polyamide composition is disclosed. The method includes providing one or more semi-crystalline polyamides. The semi-crystalline polyamides can be any of those disclosed herein. In some embodiments, the method further includes providing one or more amorphous polyamides or a PA66/6I copolyamide. The amorphous polyamide or PA66/6I copolyamide can be any of those disclosed herein. In some embodiments, the method further includes providing one or more heat stabilizers, lubricants, and/or reinforcing agents. In some embodiments, the method further includes selecting the type of semi-crystalline polyamides, amorphous polyamides, PA66/6I copolyamides, heat stabilizers, lubricants, and/or reinforcing agents to provide desired thermal, damping, and mechanical properties to the resulting polyamide composition.

The method further includes blending the one or more semi-crystalline polyamides with the amorphous polyamide or PA66/6I copolyamide. In some embodiments, the method further includes blending one or more heat stabilizers, lubricants, and/or reinforcing agents into the polyamide composition. In some embodiments, the method further includes selecting the amount of semi-crystalline polyamides, amorphous polyamides, PA66/6I copolyamides, heat stabilizers, lubricants, and/or reinforcing agents to provide desired thermal, damping, and mechanical properties to the resulting polyamide composition. As used herein, the term "blending" is intended to encompass either the addition of the material itself to the composition or the in situ formation of the material in the composition. In some embodiments, two or more materials to be combined with the composition are simultaneously added via masterbatch.

EXAMPLES

The present disclosure will be better understood in view of the following non-limiting examples. The following examples are intended for illustrative purposes only and do not limit in any way the scope of the present disclosure.

The polyamide compositions of Examples 1-10 and Comparative Example A were prepared using the materials and amounts as shown in Table 1. For the amorphous polyamide, For each of the compositions, mechanical, thermal, and damping properties were measured according to the standard procedures referenced herein.

The amorphous polyamide had a $T_g$ of 125° C. and little or no moisture content; a tensile modulus of approximately 3 GPa; and a density of approximately 1.18 g/cm$^3$.

TABLE 1

| | Comp. Ex. A | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| PA66/6I (wt %) | | | | | 47.47 | 55.38 | 47.47 | | | | |
| PA66/6 (wt %) | | | | | 15.83 | | | | | | |
| PA6 (wt %) | | 10.6 | 5.3 | | | | | | | | |
| PA66 (wt %) | 62.73 | 42.2 | 42.2 | 42.2 | | | | 31.7 | 31.3 | 35.3 | |
| PA66/6C (wt %) | | | | | | | | | | | 31.3 |
| Amorphous polyamide (wt %) | | 10.6 | 15.8 | 21.1 | | 7.92 | 15.83 | 31.7 | 32 | 28 | 31.65 |
| Aluminum stearate (wt %) | | 0.3 | 0.3 | 0.3 | 0.3 | 0.3 | 0.3 | 0.3 | 0.3 | 0.3 | 0.3 |
| Heat stabilizer (wt %) | 0.35 | 0.4 | 0.4 | 0.4 | 0.4 | 0.4 | 0.4 | 0.4 | 0.4 | 0.4 | 0.4 |
| 35% Carbon black (wt %) | 0.12 | 1.0 | 1.0 | 1.0 | 1.0 | 1.0 | 1.0 | 1 | 1 | 1 | 1 |
| 33% Nigrosine (wt %) | 1.5 | | | | | | | | | | |
| Glass fiber (wt %) | 35.3 | 35.0 | 35.0 | 35.0 | 35.0 | 35.0 | 35.0 | 35 | 35 | 35 | 35 |
| Tensile strength (MPa) | 210 | 192 | 198 | 196 | 197 | 199 | 196 | 195 | 201 | 199 | 191 |
| Elongation at break (%) | 3.0 | 2.7 | 2.9 | 2.5 | 2.8 | 2.7 | 2.6 | 2.6 | 2.4 | 2.9 | 3 |
| Tensile modulus (GPa) | 11.600 | 11.638 | 11.736 | 11.748 | 11.940 | 11.674 | 11.418 | 11.334 | 10.822 | 11.427 | 11.002 |
| Notched Charpy (kJ/m$^2$) | 12.0 | 11.0 | 10.0 | 10.4 | 10.8 | 10.4 | 10.6 | 9.9 | 9.5 | 9.6 | 10.1 |
| Un-notched Charpy (kJ/m$^2$) | 80 | 71 | 72 | 68 | 79 | 70 | 74 | 71 | 70 | 69 | 76 |
| 2nd Melting point (° C.) | | 256 | 257 | 257 | 234 | 234 | 233 | 253 | 259 | 262 | 261 |
| 4th Melting point (° C.) | | 253 | 254 | 254 | 231 | 231 | 230 | | | | |
| Heat distortion temperature (° C.) | 250 | 231 | 230 | 229 | 207 | 206 | 190 | 195 | | 193 | 206 |
| Peak tan (δ) temperature (° C.) | 72 | 78 | 84 | 91 | 73 | 86 | 92 | 102 | 110 | 108 | 102 |
| Peak tan (δ) value | 0.056 | 0.098 | 0.111 | 0.124 | 0.091 | 0.121 | 0.189 | 0.198 | 0.246 | 0.182 | 0.226 |
| HDT − $T_m$ (° C.) | | ≤25 | ≤27 | ≤28 | ≤27 | ≤28 | ≤43 | | | | |

The compositions of Examples 1 and 2 are each based on a blend of semi-crystalline PA66 and PA6 polyamides together with an amorphous polyamide. The data in Table 1 show that both the peak tan(δ) temperature and peak tan(δ) value of these Examples increased relative to those of Comparative Example A. Additionally, the difference between the heat distortion temperature and melting temperatures for each of these Examples is less than 30° C. The data also show no deleterious effects on thermal or physical properties relative to those of the Comparative Example. These results thus demonstrate that high-temperature damping performance can be improved without affecting mechanical performance for polyamide compositions including an amorphous polyamide additive as disclosed herein.

The composition of Example 3 is based on a blend of semi-crystalline PA66 polyamide together with an amorphous polyamide. The data in Table 1 show that both the peak tan(δ) temperature and peak tan(δ) value of this Example increased relative to those of Comparative Example A. Additionally, the difference between the heat distortion temperature and melting temperatures for this Example is less than 30° C. The data also show no deleterious effects on thermal or physical properties relative to those of the Comparative Example. These results thus further demonstrate that high-temperature damping performance can be improved without affecting mechanical performance for polyamide compositions including an amorphous polyamide additive as disclosed herein.

The composition of Example 4 is based on a blend of semi-crystalline PA66/6I and PA66/6 (co)polyamides. The data in Table 1 show that both the peak tan(δ) temperature and peak tan(δ) value of this Example increased relative to those of Comparative Example A. Additionally, the difference between the heat distortion temperature and melting temperatures for this Example is less than 30° C. The data also show no deleterious effects on thermal or physical properties relative to those of the Comparative Example. These results thus demonstrate that high-temperature damping performance can be improved without affecting mechanical performance for polyamide compositions including a PA66/6I copolymer additive as disclosed herein.

The compositions of Examples 5 and 6 are each based on a blend of semi-crystalline PA66/6I polyamide together with an amorphous polyamide. The data in Table 1 show that both the peak tan(δ) temperature and peak tan(δ) value of these Examples increased relative to those of Comparative Example A. The data also show no deleterious effects on thermal or physical properties relative to those of the Comparative Example. These results thus demonstrate that high-temperature damping performance can be improved without affecting mechanical performance for polyamide compositions including an amorphous polyamide or PA66/6I copolymer additive as disclosed herein.

FIG. 1 shows the tan(δ) performance of dry-as-molded (DAM) of Examples 1-10, which employ the semi-crystalline and amorphous polyamides listed in Table 1. As shown, Examples 1-10 demonstrate improved tan(δ) performance over Comp. Ex. A. For example, the Examples show significantly higher peak tan(δ) temperatures over Comp. Ex. A—see lower line (Comp. Ex. A) vs. upper lines (Exs. 1-10).

EMBODIMENTS

The following embodiments are contemplated. All combinations of features and embodiments are contemplated.

Embodiment 1: A composition comprising: one or more amorphous polyamides; and one or more semi-crystalline polyamides; wherein the composition exhibits a maximum viscoelastic loss factor (tan(δ)) at a temperature greater than 50° C. (ranging from 73° C. to 103° C.) when the composition has a moisture content less than 0.2 wt %.

Embodiment 2: An embodiment of embodiment 1, wherein the combined concentration of the one or more amorphous polyamides in the composition ranges from 3 wt % to 65 wt % (from 3 wt % to 53 wt %).

Embodiment 3: An embodiment of embodiment 1 or 2, wherein the combined concentration of the one or more semi-crystalline polyamides in the composition ranges from 30 wt % to 80 wt % (from 10 wt % to 70 wt %).

Embodiment 4: An embodiment o30f any of the embodiments of embodiment 1-3, wherein the ratio of the combined weight of the one or more semi-crystalline polyamides in the composition to the combined weight of the one or more amorphous polyamides in the composition ranges from 0.06:1 to 13:1 (from 1:1 to 13:1).

Embodiment 5: An embodiment of any of the embodiments of embodiment 1-4, wherein the maximum tan(δ) has a value ranging from 0.057 to 0.245 (from 0.095 to 0.245) when the composition has a moisture content less than 0.2 wt %.

Embodiment 6: An embodiment of any of the embodiments of embodiment 1-5, wherein the difference between (1) a heat distortion temperature (HDT) exhibited by the composition at 1.82 MPa and (2) a melting temperature ($T_m$) exhibited by the composition ranges from 1° C. to 100° C. (from 15° C. to 45° C. or less than 30° C.) when the composition has a moisture content less than 0.2 wt %.

Embodiment 7: An embodiment of any of the embodiments of embodiment 1-6, wherein at least one of the one or more amorphous polyamides exhibits a glass transition temperature ($T_g$) greater than 100° C. (ranging from 100° C. to 150° C.).

Embodiment 8: An embodiment of any of the embodiments of embodiment 1-7, wherein the one or more amorphous polyamides comprise an amorphous copolyamide.

Embodiment 9: An embodiment of any of the embodiments of embodiment 1-8, wherein the one or more semi-crystalline polyamides comprise one or more PA66 polyamides.

Embodiment 10: An embodiment of any of the embodiments of embodiment 1-9, wherein the one or more semi-crystalline polyamides comprise one or more PA6 polyamides.

Embodiment 11: An embodiment of any of the embodiments of embodiment 1-10, wherein the one or more semi-crystalline polyamides comprise one or more PA66/6 (co)polyamide.

Embodiment 12: An embodiment of any of the embodiments of embodiment 1-11, wherein the one or more semi-crystalline polyamides comprise one or more PA66/6I polyamides and/or PA66/6C.

Embodiment 13: An embodiment of any of the embodiments of embodiment 12, wherein at least one of the one or more PA66/6I polyamides comprises an isophthalic acid content ranging from 5 mol % to 30 mol %.

Embodiment 14: An embodiment of any of the embodiments of embodiment 1-13, further comprising: from 0.1 wt % to 2 wt % of one or more lubricants.

Embodiment 15: An embodiment of embodiment 14, wherein the one or more lubricants comprise aluminum stearate.

Embodiment 16: An embodiment of any of the embodiments of embodiment 1-15, further comprising: from 0.1 wt % to 2 wt % of one or more heat stabilizers.

Embodiment 17: An embodiment of embodiment 16, wherein at least one of the one or more heat stabilizers comprises copper.

Embodiment 18: An embodiment of any of the embodiments of embodiment 1-17, further comprising: from 15 wt % to 60 wt % one or more mineral or fiber reinforcements.

Embodiment 19: An embodiment of embodiment 18, wherein the one or more mineral or fiber reinforcements comprise glass fiber.

Embodiment 20: An embodiment of embodiment 1, comprising: from 20 wt % to 55 wt % semi-crystalline PA66 polyamide; from 20 wt % to 55 wt % semi-crystalline PA66/6I polyamide; from 0 to 11 wt % semi-crystalline PA6 polyamide; from 8 wt % to 40 wt % amorphous polyamide; from 15 wt % to 60 wt % glass fiber; from 0.1 wt % to 2 wt % aluminum stearate; from 0.1 wt % to 2 wt % copper heat stabilizer; from 0 to 6 wt % colorant; and a moisture content less than 0.2 wt %; wherein the maximum tan($\delta$) value of the composition ranges from 0.095 to 0.15 and is exhibited at a temperature from 75° C. to 95° C.

Embodiment 21: An embodiment of embodiment 1, comprising: from 20 wt % to 55 wt % semi-crystalline PA66 polyamide; from 20 wt % to 55 wt % semi-crystalline PA66/6I polyamide; from 0 to 11 wt % semi-crystalline PA6 polyamide; from 8 wt % to 40 wt % amorphous polyamide; from 15 wt % to 60 wt % glass fiber; from 0.1 wt % to 2 wt % aluminum stearate; from 0.1 wt % to 2 wt % copper heat stabilizer; from 0 to 6 wt % colorant; and a moisture content less than 0.2 wt %; wherein the maximum tan($\delta$) of the composition is exhibited at a temperature ranging from 75° C. to 95° C.; and wherein the difference between (1) the HDT of the composition at 1.82 MPa and (2) the $T_m$ of the composition ranges from 15° C. to 45° C.

Embodiment 22: An embodiment of any of the embodiments of embodiment 1-21, exhibiting a tensile strength ranging from 150 MPa to 255 MPa, as measured in accordance with standard test method ASTM D882-18 (2018).

Embodiment 23: An embodiment of embodiment 1, comprising: from 20 wt % to 55 wt % semi-crystalline PA66 polyamide; from 20 wt % to 55 wt % semi-crystalline PA66/6I polyamide; from 0 to 11 wt % semi-crystalline PA6 polyamide; from 8 wt % to 40 wt % amorphous polyamide; from 15 wt % to 60 wt % glass fiber; from 0.1 wt % to 2 wt % aluminum stearate; from 0.1 wt % to 2 wt % copper heat stabilizer; from 0 to 6 wt % colorant; and a moisture content less than 0.2 wt %; wherein the maximum tan($\delta$) of the composition is exhibited at a temperature ranging from 75° C. to 95° C.; and wherein the tensile strength of the composition ranges from 185 MPa to 205 MPa.

Embodiment 24: An embodiment of any of the embodiments of embodiment 1-23, exhibiting an elongation at break ranging from 1.5% to 5%, as measured in accordance with standard test method ASTM D882-18 (2018).

Embodiment 25: An embodiment of any of the embodiments of embodiment 1-24, exhibiting a tensile modulus greater than 9.5 GPa, e.g., ranging from 9.5 GPa to 20.5 GPa, as measured in accordance with standard test method ASTM D882-18 (2018).

Embodiment 26: An embodiment of any of the embodiments of embodiment 1-25, exhibiting a notched Charpy impact strength ranging from 7 kJ/m$^2$ to 15 kJ/m$^2$.

Embodiment 27: An embodiment of any of the embodiments of embodiment 1-26, exhibiting an un-notched Charpy impact strength ranging from 50 kJ/m$^2$ to 100 kJ/m$^2$.

Embodiment 28: An embodiment of any of the embodiments of embodiment 1-27, exhibiting a $T_m$ ranging from 205° C. to 285° C.

Embodiment 29: An embodiment of any of the embodiments of embodiment 1-28, exhibiting an HDT at 1.82 MPa greater than 185° C., e.g., ranging from 185° C. to 255° C.

Embodiment 30: A composition comprising: from 1 wt % to 50 wt % of a semi-crystalline PA66/6 (co)polyamide; from 30 wt % to 80 wt % of a material selected from the list consisting of a second semi-crystalline polyamide and an amorphous polyamide; wherein the composition exhibits a maximum tan($\delta$) at a temperature greater than 50° C. (ranging from 73° C. to 103° C.) when the composition has a moisture content less than 0.2 wt %.

Embodiment 31: An embodiment of embodiment 30, wherein the second semi-crystalline polyamide comprises PA66/I polyamide comprising an isophthalic acid content ranging from 5 mol % to 30 mol %.

Embodiment 32: An embodiment of embodiment 30 or 31, wherein the maximum tan($\delta$) has a value ranging from 0.057 to 0.245 (from 0.095 to 0.245) when the composition has a moisture content less than 0.2 wt %.

Embodiment 33: An embodiment of any of the embodiments of embodiment 30-32, wherein the amorphous polyamide exhibits a glass transition temperature ($T_g$) greater than 100° C. (ranging from 100° C. to 150° C.).

Embodiment 34: An embodiment of any of the embodiments of embodiment 30-33, wherein the amorphous polyamide comprises a partially aromatic polyamide.

Embodiment 35: An embodiment of any of the embodiments of embodiment 30-34, wherein the amorphous polyamide comprises an amorphous copolyamide.

Embodiment 36: An embodiment of any of the embodiments of embodiment 30-35, wherein the second semi-crystalline polyamide comprises a PA66 polyamide.

Embodiment 37: An embodiment of any of the embodiments of embodiment 30-35, wherein the second semi-crystalline polyamide comprises a PA6 polyamides.

Embodiment 38: An embodiment of any of the embodiments of embodiment 30-35, wherein the second semi-crystalline polyamide comprises a PA66/I polyamide.

Embodiment 39: An embodiment of any of the embodiments of embodiment 30-38, further comprising: from 0.1 wt % to 2 wt % of one or more lubricants.

Embodiment 40: An embodiment of embodiment 39, wherein the one or more lubricants comprise aluminum stearate.

Embodiment 41: An embodiment of any of the embodiments of embodiment 30-40, further comprising: from 0.1 wt % to 2 wt % of one or more heat stabilizers.

Embodiment 42: An embodiment of embodiment 41, wherein at least one of the one or more heat stabilizers comprises copper.

Embodiment 43: An embodiment of any of the embodiments of embodiment 30-42, further comprising: from 15 wt % to 60 wt % one or more mineral or fiber reinforcements.

Embodiment 44: An embodiment of embodiment 43, wherein the one or more mineral or fiber reinforcements comprise glass fiber.

Embodiment 45: An embodiment of any of the embodiments of embodiment 30-44, exhibiting a tensile strength ranging from 150 MPa to 255 MPa, as measured in accordance with standard test method ASTM D882-18 (2018).

Embodiment 46: An embodiment of any of the embodiments of embodiment 30-45, exhibiting an elongation at break ranging from 1.5% to 5%, as measured in accordance with standard test method ASTM D882-18 (2018).

Embodiment 47: An embodiment of any of the embodiments of embodiment 30-46, exhibiting a tensile modulus ranging from 9.5 GPa to 20.5 GPa, as measured in accordance with standard test method ASTM D882-18 (2018).

Embodiment 48: An embodiment of any of the embodiments of embodiment 30-47, exhibiting a notched Charpy impact strength ranging from 7 kJ/m$^2$ to 15 kJ/m$^2$.

Embodiment 49: An embodiment of any of the embodiments of embodiment 30-48, exhibiting an un-notched Charpy impact strength ranging from 50 kJ/m$^2$ to 100 kJ/m$^2$.

Embodiment 50: An article molded from a resin having the composition of an embodiment of any of the embodiments of embodiment 1-49.

Embodiment 51: a composition comprising one or more amorphous polyamides; one or more semi-crystalline polyamides; wherein the composition exhibits a maximum viscoelastic loss factor (tan(δ)) at a temperature greater than 40° C. when the composition has a moisture content less than 0.2 wt %.

Embodiment 52: An embodiment of embodiment 51, wherein the combined concentration of the one or more amorphous polyamides in the composition ranges from 10 wt % to 70 wt %.

Embodiment 53: An embodiment of embodiment 51 or 52, wherein the combined concentration of the one or more semi-crystalline polyamides in the composition ranges from 10 wt % to 70 wt %.

Embodiment 54: An embodiment of any of embodiments 51-53, wherein the semi-crystalline polyamide comprises PA66/6C.

Embodiment 55: An embodiment of any of embodiments 51-54, wherein the composition comprises from 10 wt % to 70 wt % PA66/6C.

Embodiment 56: An embodiment of any of embodiments 51-55, wherein the tensile modulus is greater than 9.5 GPa, and wherein the composition exhibits a maximum viscoelastic loss factor (tan(δ)) at a temperature greater than 42° C. when the composition has a moisture content less than 0.2 wt %.

Embodiment 57: An embodiment of any of embodiments 51-56, wherein the tensile modulus is greater than 9.5 GPa and the heat distortion temperature is greater than 185° C.

Embodiment 58: An embodiment of any of embodiments 51-57, wherein the amorphous polyamide comprises polyamide blends of MPMD-T and MPMD-I.

Embodiment 59: An embodiment of any of embodiments 51-58, wherein the amorphous polyamide comprises polyamide blends of MPMD-T and MPMD-I and the semi-crystalline polyamide comprises PA66/6C.

Embodiment 60: An embodiment of any of embodiments 51-59, comprising from 20 wt % to 55 wt % semi-crystalline PA66 polyamide; from 0 to 11 wt % semi-crystalline PA6 polyamide; from 10 wt % to 70 wt % polyamide blends with MPMD-T/MPMD-I; from 15 wt % to 60 wt % glass fiber; from 0.1 wt % to 2 wt % stearate; from 0.1 wt % to 2 wt % heat stabilizer; from 0 to 6 wt % colorant; and a moisture content less than 0.2 wt %.

Embodiment 61: An embodiment of any of embodiments 51-60, comprising from 10 wt % to 70 wt % semi-crystalline PA66/6C; from 0 to 11 wt % semi-crystalline PA6 polyamide; from 10 wt % to 70 wt % amorphous polyamide; from 15 wt % to 60 wt % glass fiber; from 0.1 wt % to 2 wt % stearate; from 0.1 wt % to 2 wt % heat stabilizer; from 0 to 6 wt % colorant; and a moisture content less than 0.2 wt %.

Embodiment 62: A composition comprising: a low $T_g$ polymer with a $T_g$ from 100° C. to 200° C., and a high $T_g$ polymer with a Tg from 0° C. to 160° C., wherein the composition exhibits a maximum viscoelastic loss factor (tan(δ)) at a temperature greater than 40° C. when the composition has a moisture content less than 0.2 wt %.

Embodiment 63: A connecting part, the part comprising: a part body for contacting a first component; and a part tab for contacting a second component to connect the first and second components, wherein at least one of the part body and the part tab comprise a composition comprising: one or more amorphous polyamides; and one or more semi-crystalline polyamides; wherein the part exhibits a maximum viscoelastic loss factor (tan(δ)) at a temperature greater than 40° C. when the composition has a moisture content less than 0.2 wt %.

Embodiment 64: A connecting part, the part comprising: a part body for contacting a first component, and a part tab for contacting a second component to connect the first and second components, wherein at least one of the part body and the part tab comprise a composition comprising: from 1 wt % to 50 wt % of a semi-crystalline PA66/6 (co)polyamide; from 30 wt % to 80 wt % of a material selected from the list consisting of a second semi-crystalline polyamide and an amorphous polyamide; wherein the part exhibits a maximum tan(δ) at a temperature greater than 40° C. when the composition has a moisture content less than 0.2 wt %.

Embodiment 65, an embodiment of embodiments 63 or 64, further comprising a structural support piece.

Embodiment 66, and embodiment of any of embodiments 63-65, wherein the part is an engine mount, a differential mount, a torque rod, and HVAC compressor bracket, a strut mount, a shock absorber mount, or a transmission mount, or a combination thereof.

Embodiment 67: A process for connecting a first component to a second component, the process comprising: providing a connecting part comprising a part body and a part tab; contacting the part body with the first component; and contacting the part tab with the second component to connect first and second components, wherein the part exhibits a maximum tan(δ) at a temperature greater than 40° C. when the composition has a moisture content less than 0.2 wt %.

Embodiment 68: the embodiment of embodiment 67, wherein the connecting part is an engine mount, the first component is an engine, and the second component is a chassis.

While the invention has been described in detail, modifications within the spirit and scope of the invention will be readily apparent to those of skill in the art in view of the foregoing discussion, relevant knowledge in the art, and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A composition comprising:
   one or more amorphous polyamides;
   one or more semi-crystalline polyamides; and
   an additive;
   wherein the difference between the heat distortion temperature and melting temperature of the composition is less than 45° C.;
   wherein the composition exhibits a maximum viscoelastic loss factor (tan(δ)) at a temperature greater than 40° C. when the composition has a moisture content less than or equal to 0.2 wt %; and
   wherein the maximum tan(δ) has a value ranging from 0.057 to 0.245 when the composition has a moisture content less than 0.2 wt %;
   wherein the composition is free of non-polyamide polymers, flow enhancers, and flow aids.

2. The composition of claim 1, wherein the combined concentration of the one or more amorphous polyamides in the composition ranges from 3 wt % to 65 wt %.

3. The composition of claim 1, wherein the combined concentration of the one or more semi-crystalline polyamides in the composition ranges from 10 wt % to 70 wt %.

4. The composition of claim 1, wherein the one or more semi-crystalline polyamides comprise one or more PA66 polyamides.

5. The composition of claim 1, wherein the one or more semi-crystalline polyamides comprises PA66/6C.

6. The composition of claim 1, wherein the composition demonstrates a tensile modulus greater than 9.5 GPa, and wherein the composition exhibits a maximum viscoelastic loss factor (tan(δ)) at a temperature greater than 42° C. when the composition has a moisture content less than 0.2 wt %.

7. The composition of claim 1, wherein the composition demonstrates a tensile modulus greater than 9.5 GPa and the heat distortion temperature is greater than 185° C.

8. The composition of claim 1, wherein the one or more amorphous polyamides comprises polyamide blends of MPMD-T and MPMD-I.

9. The composition of claim 1, comprising:
from 20 wt % to 55 wt % semi-crystalline PA66 polyamide;
from 0 to 11 wt % semi-crystalline PA6 polyamide;
from 10 wt % to 70 wt % polyamide blends with MPMD-T/MPMD-I
from 15 wt % to 60 wt % glass fiber;
from 0.1 wt % to 2 wt % stearate;
from 0.1 wt % to 2 wt % heat stabilizer;
from 0 to 6 wt % colorant; and
a moisture content less than 0.2 wt %.

10. The composition of claim 1, comprising:
from 10 wt % to 70 wt % semi-crystalline PA66/6C;
from 0 to 11 wt % semi-crystalline PA6 polyamide;
from 10 wt % to 70 wt % amorphous polyamide;
from 15 wt % to 60 wt % glass fiber;
from 0.1 wt % to 2 wt % stearate;
from 0.1 wt % to 2 wt % heat stabilizer;
from 0 to 6 wt % colorant; and
a moisture content less than 0.2 wt %.

11. A composition comprising:
from 1 wt % to 50 wt % of a semi-crystalline PA66/6 (co) polyamide;
from 30 wt % to 80 wt % of a material selected from the list consisting of a second semi-crystalline polyamide and an amorphous polyamide; and
an additive;
wherein the difference between the heat distortion temperature and melting temperature of the composition is less than 45° C.;
wherein the composition exhibits a maximum viscoelastic loss factor (tan(δ)) at a temperature greater than 40° C. when the composition has a moisture content less than or equal to 0.2 wt %; and
wherein the maximum tan(δ) has a value ranging from 0.057 to 0.245 when the composition has a moisture content less than 0.2 wt %;
wherein the composition is free of non-polyamide polymers, flow enhancers, and flow aids.

12. A composition comprising:
a high $T_g$ polymer with a $T_g$ from 100° C. to 200° C.,
a low $T_g$ polymer with a $T_g$ from 0° C. to 160° C., and
an additive;
wherein the difference between the heat distortion temperature and melting temperature of the composition is less than 45° C.;
wherein the composition exhibits a maximum viscoelastic loss factor (tan(δ)) at a temperature greater than 40° C. when the composition has a moisture content less than or equal to 0.2 wt %; and
wherein the maximum tan(δ) has a value ranging from 0.057 to 0.245 when the composition has a moisture content less than 0.2 wt %;
wherein the composition is free of non-polyamide polymers, flow enhancers, and flow aids.

13. A connecting part, the part comprising:
a part body for contacting a first component; and
a part tab for contacting a second component to connect the first and second components,
wherein at least one of the part body and the part tab comprise a composition comprising:
one or more amorphous polyamides;
one or more semi-crystalline polyamides; and
an additive;
wherein the difference between the heat distortion temperature and melting temperature of the composition is less than 45° C.;
wherein the composition exhibits a maximum viscoelastic loss factor (tan(δ)) at a temperature greater than 40° C. when the composition has a moisture content less than or equal to 0.2 wt %; and
wherein the maximum tan(δ) has a value ranging from 0.057 to 0.245 when the composition has a moisture content less than 0.2 wt %;
wherein the composition is free of non-polyamide polymers, flow enhancers, and flow aids.

14. The connecting part of claim 13, further comprising a structural support piece.

15. The connecting part of claim 13, wherein the part is an engine mount, a differential mount, a torque rod, and HVAC compressor bracket, a strut mount, a shock absorber mount, or a transmission mount, or a combination thereof.

16. A connecting part, the part comprising:
a part body for contacting a first component; and
a part tab for contacting a second component to connect the first and second components,
wherein at least one of the part body and the part tab comprise a composition comprising:
from 1 wt % to 50 wt % of a semi-crystalline PA66/6 (co) polyamide;
from 30 wt % to 80 wt % of a material selected from the list consisting of a second semi-crystalline polyamide and an amorphous polyamide; and
an additive;
wherein the difference between the heat distortion temperature and melting temperature of the composition is less than 45° C.;
wherein the composition exhibits a maximum viscoelastic loss factor (tan(δ)) at a temperature greater than 40° C. when the composition has a moisture content less than or equal to 0.2 wt %; and
wherein the maximum tan(δ) has a value ranging from 0.057 to 0.245 when the composition has a moisture content less than 0.2 wt %;
wherein the composition is free of non-polyamide polymers, flow enhancers, and flow aids.

17. A process for connecting a first component to a second component, the process comprising:
providing a connecting part comprising a part body and a part tab;
contacting the part body with the first component; and
contacting the part tab with the second component to connect first and second components, wherein the difference between the heat distortion temperature and melting temperature of the part is less than 45° C.;
wherein the part comprises an additive;
wherein the part exhibits a maximum viscoelastic loss factor (tan(δ)) at a temperature greater than 40° C. when the part has a moisture content less than or equal to 0.2 wt %; and
wherein the maximum tan(δ) has a value ranging from 0.057 to 0.245 when the part has a moisture content less than 0.2 wt %;
wherein the part is free of non-polyamide polymers, flow enhancers, and flow aids.

18. The process of claim 17, wherein the connecting part is an engine mount, the first component is an engine, and the second component is a chassis.

* * * * *